(12) United States Patent
Guo et al.

(10) Patent No.: US 11,073,061 B2
(45) Date of Patent: Jul. 27, 2021

(54) MULTICOMPONENT EXHAUST TREATMENT SYSTEM INCLUDING AN OXYGEN STORAGE CATALYST

(71) Applicant: Ford Global Technologies, LLC, Dearborn, MI (US)

(72) Inventors: Gang Guo, Saline, MI (US); Jason Lupescu, Wayne, MI (US); Giovanni Cavataio, Dearborn, MI (US); Eva Thanasiu, Trenton, MI (US); Hungwen Jen, Troy, MI (US); Jeffrey Scott Hepburn, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 3 days.

(21) Appl. No.: 16/142,704

(22) Filed: Sep. 26, 2018

(65) Prior Publication Data
US 2020/0095915 A1    Mar. 26, 2020

(51) Int. Cl.
*F01N 11/00* (2006.01)
*B01D 53/94* (2006.01)
(Continued)

(52) U.S. Cl.
CPC ............ *F01N 11/00* (2013.01); *B01D 53/945* (2013.01); *B01D 53/9454* (2013.01); *B01J 23/10* (2013.01); *B01J 23/42* (2013.01); *B01J 23/745* (2013.01); *B01J 23/755* (2013.01); *B01J 29/068* (2013.01); *B01J 35/0006* (2013.01); *F01N 3/101* (2013.01); *F01N 3/105* (2013.01); *F01N 3/28* (2013.01); *F02D 41/0235* (2013.01); *B01D 2255/102* (2013.01); *B01D 2255/20753* (2013.01); *B01D 2255/50* (2013.01); *B01D 2255/908* (2013.01); *B01D 2255/9022* (2013.01); *B60K 6/22* (2013.01); *B60W 20/16* (2016.01); *B60W 2710/0627* (2013.01); *B60Y 2200/92* (2013.01);
(Continued)

(58) Field of Classification Search
CPC combination set(s) only.
See application file for complete search history.

(56) References Cited

U.S. PATENT DOCUMENTS

| 6,402,989 B1 | 6/2002 | Gaffney |
| 8,506,912 B1 | 8/2013 | Hepburn et al. |

(Continued)

FOREIGN PATENT DOCUMENTS

| CN | 102834165 A | 12/2012 |
| DE | 102013207492 A1 | 10/2013 |

OTHER PUBLICATIONS

Bergeret, G. et al., "X-ray Study of the Activation, Reduction, and Reoxidation of Palladium in Y-Type Zeolites," Journal of Physical Chemistry, vol. 85, No. 4, Feb. 1981, 6 pages.

(Continued)

*Primary Examiner* — Binh Q Tran
(74) *Attorney, Agent, or Firm* — Geoffrey Brumbaugh; McCoy Russell LLP

(57) ABSTRACT

Methods and systems are provided for a multicomponent aftertreatment device arranged in a vehicle exhaust gas passage. In one example, a system may include an oxygen storage catalyst and an underbody trap catalyst comprising metal modified zeolite, the oxygen storage catalyst arranged upstream of the underbody trap catalyst in an exhaust passage of the vehicle.

18 Claims, 9 Drawing Sheets

(51) Int. Cl.
  *F01N 3/10* (2006.01)
  *F01N 3/28* (2006.01)
  *B01J 29/068* (2006.01)
  *B01J 23/755* (2006.01)
  *B01J 23/745* (2006.01)
  *B01J 23/10* (2006.01)
  *B01J 23/42* (2006.01)
  *B01J 35/00* (2006.01)
  *F02D 41/02* (2006.01)
  *B60K 6/22* (2007.10)
  *B60W 20/16* (2016.01)

(52) U.S. Cl.
  CPC ...... *F01N 2370/04* (2013.01); *F01N 2510/06* (2013.01); *F01N 2550/02* (2013.01); *F02D 2200/50* (2013.01)

(56) References Cited

U.S. PATENT DOCUMENTS

| | | | |
|---|---|---|---|
| 8,557,204 B2 | 10/2013 | Nunan et al. | |
| 9,163,540 B2* | 10/2015 | Nobukawa | F01N 3/103 |
| 9,403,157 B2 | 8/2016 | Jen et al. | |
| 9,636,634 B2* | 5/2017 | Chiffey | B01D 53/72 |
| 10,253,667 B2* | 4/2019 | Yang | B01D 53/9418 |
| 2006/0228283 A1* | 10/2006 | Malyala | B01J 23/66 |
| | | | 423/239.1 |
| 2007/0051094 A1* | 3/2007 | Tanada | B01D 53/945 |
| | | | 60/277 |
| 2007/0137187 A1* | 6/2007 | Kumar | F01N 13/0097 |
| | | | 60/299 |
| 2012/0216508 A1* | 8/2012 | Collins | F01N 3/0807 |
| | | | 60/274 |
| 2012/0308439 A1 | 12/2012 | Chen et al. | |
| 2013/0058848 A1* | 3/2013 | Nunan | B01D 53/945 |
| | | | 423/213.5 |
| 2013/0287660 A1* | 10/2013 | Nunan | B01D 53/94 |
| | | | 423/213.5 |
| 2014/0322114 A1* | 10/2014 | Jen | B01J 23/8946 |
| | | | 423/213.5 |
| 2015/0360178 A1* | 12/2015 | Kalwei | B01D 53/9477 |
| | | | 423/212 |
| 2016/0237875 A1* | 8/2016 | Hagiwara | F01N 13/009 |
| 2016/0245207 A1* | 8/2016 | Ball | F01N 13/009 |
| 2017/0241313 A1* | 8/2017 | Wan | F01N 3/2066 |
| 2018/0156090 A1* | 6/2018 | Xue | F01N 3/2073 |

OTHER PUBLICATIONS

Pommier, B. et al., "Infrared and volumetric study of NO adsorption on Pd—H—ZSM-5," Physical Chemistry Chemical Physics, vol. 3, No. 6, Feb. 23, 2001, 6 pages.

* cited by examiner

MULTICOMPONENT EXHAUST TREATMENT SYSTEM INCLUDING AN OXYGEN STORAGE CATALYST

FIELD

The present description relates generally to methods and systems for treating combustion byproducts via one or more exhaust aftertreatment devices.

BACKGROUND/SUMMARY

To keep pace with increasingly stringent vehicle emissions standards, multicomponent exhaust aftertreatment devices of ever more complex compositions are being employed. In particular, federal regulations mandate the restriction of hydrocarbon (HC), carbon monoxide (CO), and nitrogen oxide ($NO_x$) emissions from internal combustion engines. Component catalysts may not only convert a majority of these types of emissions into permissible chemical byproducts, but also the individual functions of each component catalyst may improve the individual functions of the other component catalysts.

In particular, close-coupled (CC) three-way catalysts (TWCs) have been developed to accomplish conversion of each of the three categories of regulated emissions following passage of the emissions from the engine block to the TWC. However, since TWCs are sufficiently functional only during warmed-up engine temperatures, emissions released into the exhaust passage immediately following a cold start are unlikely to be properly regulated. To limit such emissions, additional catalysts may be placed downstream in the far vehicle underbody (UB) to trap further HC, CO, and $NO_x$ emissions by adsorbing them in, for example, zeolites modified by platinum group metals (PGMs). When temperatures warm up during vehicle operation, these trapping materials then release the trapped emissions. The UB trap catalysts may further incorporate TWC layers which then convert these emissions into water, $CO_2$, $N_2$, and other byproducts upon release from the trapping layer. However, the TWC layers require excess oxygen at all times during the exhaust cycle for the oxidation of HCs and CO.

An approach for supplying this excess oxygen includes the use of oxygen storage materials in exhaust emission control systems. One example, a Ni-based oxygen storage catalyst, is shown by Hepburn et al. in U.S. Pat. No. 8,506,912. In another example, Jen et al. (U.S. Pat. No. 9,403,157) disclose an oxygen storage catalyst containing a mixture of Ni and Cu. In each of Hepburn and Jen, the oxygen storage catalyst provides supplemental oxygen capacity for use in reducing HC, CO, and $NO_x$ emissions from a vehicle exhaust that might otherwise go unconverted in the TWC.

The inventors herein have recognized shortcomings in the above approach. In particular, Hepburn and Jen each fail to recognize that the supplemental oxygen storage capacity of the Ni-based oxygen storage catalyst may be utilized to supply oxygen to the exhaust gas and dampen fuel-rich exhaust gas excursions to protect downstream catalyst components that are particularly vulnerable to a hot reducing environment. For example, Hepburn and Jen each fail to recognize that UB trap catalysts including trapping layers composed of PGM-modified zeolites may degrade under fuel-rich air/fuel ratios (AFRs) and high exhaust temperatures, thereby decreasing UB trap catalyst performance. Bergeret et al. in "X-ray Study of the Activation, Reduction, and Reoxidation of Palladium in Y-Type Zeolites," *J. Phys. Chem.*, 1981, vol. 55, pp. 411-416, taught that irreversible deactivation of a Pd-containing zeolite occurs upon reduction in hydrogen from 550 to 780 K (277 to 507° C.) due to formation of Pd metal and sintering to large particles; subsequent oxidation treatments at the same temperature led to formation of similarly sized PdO particles rather than the desired atomically dispersed $Pd^{2+}$ at zeolite ion exchange sites. This is significant since Pommier et al. in "Infrared and Volumetric Study of NO Adsorption on Pd—H-ZSM-5," *Phys. Chem. Chem. Phys.*, 2001, vol. 3, pp. 1138-1143, taught that atomically dispersed Pd at zeolite ion exchange sites are effective $NO_x$ traps, while PdO particles supported on zeolite are not. By not recognizing that fuel-rich AFR excursions may lead to UB trap catalyst degradation, Hepburn and Jen necessarily fail to recognize that an oxygen storage catalyst may be positioned in front of the UB trap catalyst to dampen the fuel-rich AFR excursions reaching the UB trap catalyst. Further, Jen fails to recognize that the total oxidation of a fully reduced Ni-based oxygen storage catalyst in a combustion exhaust stream can enhance the thermal damage of the underlying zeolite components on the same substrate. While zeolites in conventional HC traps are coated with TWC materials containing ceria mixed oxides, adding Ni to a zeolite support as Jen proposes creates an additional deactivation path for materials that are particularly vulnerable to a hot steam environment. If we assume a similar mass of Ni added to zeolite as $Ce_2O_3$ in the TWC washcoat, then the oxidation of 1 g of Ni to NiO ($\Delta H=-240$ kJ/mol) gives off 250% more heat energy than the oxidation of 1 g of $Ce_2O_3$ to $2CeO_2$ ($\Delta H=-380$ kJ/mol). Jen fails to recognize that the Ni-based oxygen storage catalyst could damage the supporting zeolite catalyst on the same monolith substrate by heat generated from Ni oxidation to NiO.

Accordingly, the inventors herein provide a system to at least partly address the above issues. In one example, the issues described above may be addressed by a system for a vehicle including an oxygen storage catalyst and an underbody trap catalyst comprising metal modified zeolite, the oxygen storage catalyst arranged upstream of the underbody trap catalyst in an exhaust passage of the vehicle. In this way, the oxygen storage catalyst may release oxygen during fuel-rich AFR conditions, thereby increasing AFR at the downstream underbody trap catalyst. In doing so, degradation of the underbody trap catalyst due to sintering of the metal in the metal-modified zeolite resulting from fuel-rich AFR and high exhaust temperature may be diminished. Further, by separating the Ni-based oxygen storage catalyst from the PGM zeolite catalyst (the CC vs. UB locations, respectively), any heat generated from Ni oxidation to NiO may be dissipated in the exhaust gas before degrading the downstream PGM-modified zeolite catalyst. In addition, the upstream location of the Ni-based oxygen storage catalyst may enable it to warm up earlier and be ready to provide oxygen to convert fuel-rich exhaust excursions before the downstream PGM zeolite catalyst is hot enough to be degraded by a reducing environment.

In some examples, the system described above may include a controller having computer-readable instructions stored thereon that when executed enable the controller to determine a rate of degradation of the underbody trap catalyst based on a degradation state of the nickel-based oxygen storage catalyst, and responsive to the rate of degradation increasing to a threshold rate, adjust fuel-rich air/fuel ratio excursion duration and intensity via changes to engine speed, vehicle speed, fuel injection, engine load, and/or engine torque output. In this way, the extent of catalyst degradation may be reduced by the placement of a nickel-based oxygen storage catalyst and a degradation monitoring system, thereby lowering associated expenses and further restricting exhaust emissions by prolonging the useful life of the multicomponent exhaust aftertreatment device.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
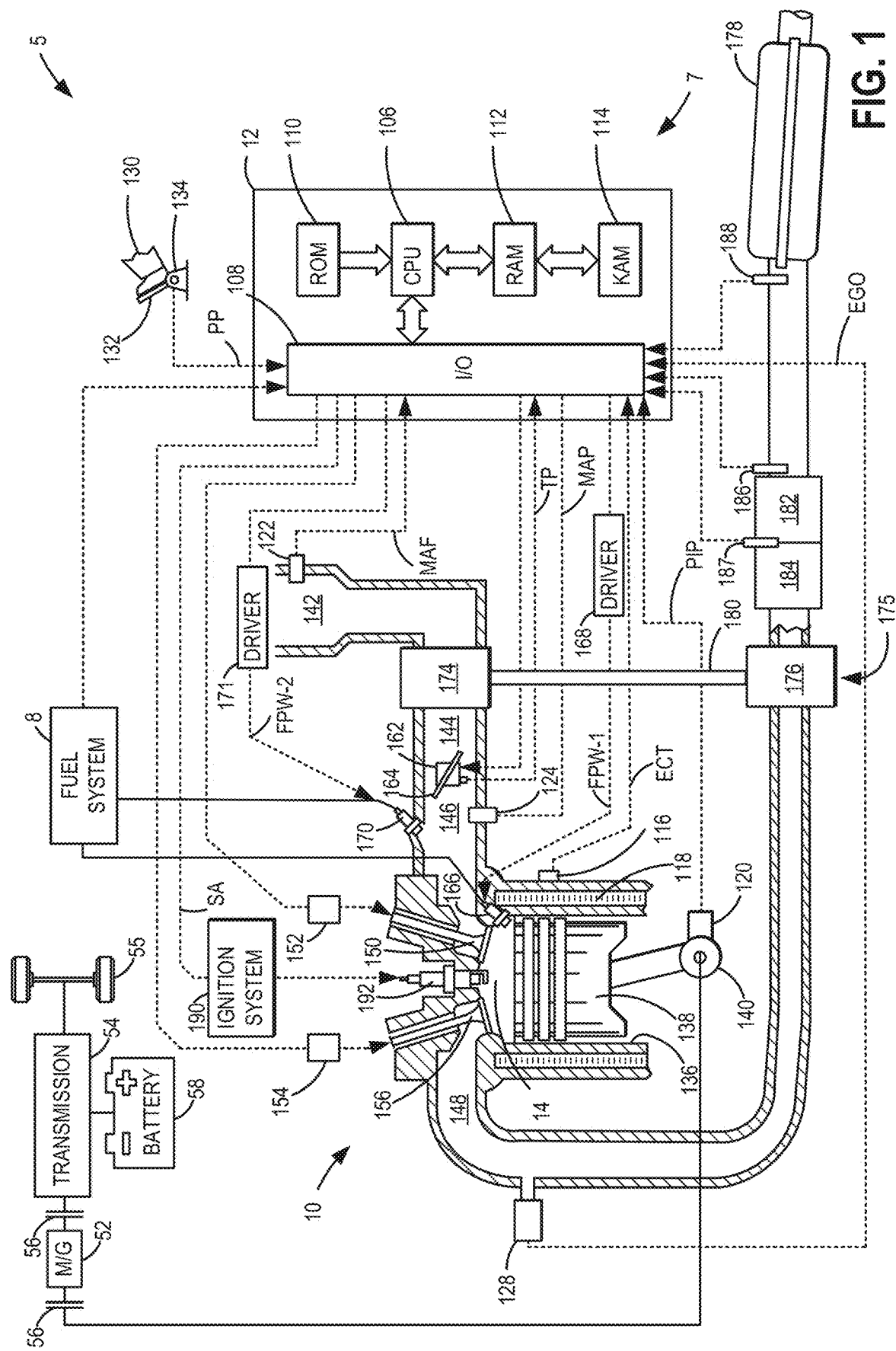
FIG. 1 shows a schematic diagram of an example cylinder of a multi-cylinder engine with three emission control catalysts coupled to a catalyst monitor system.
Figure 2:
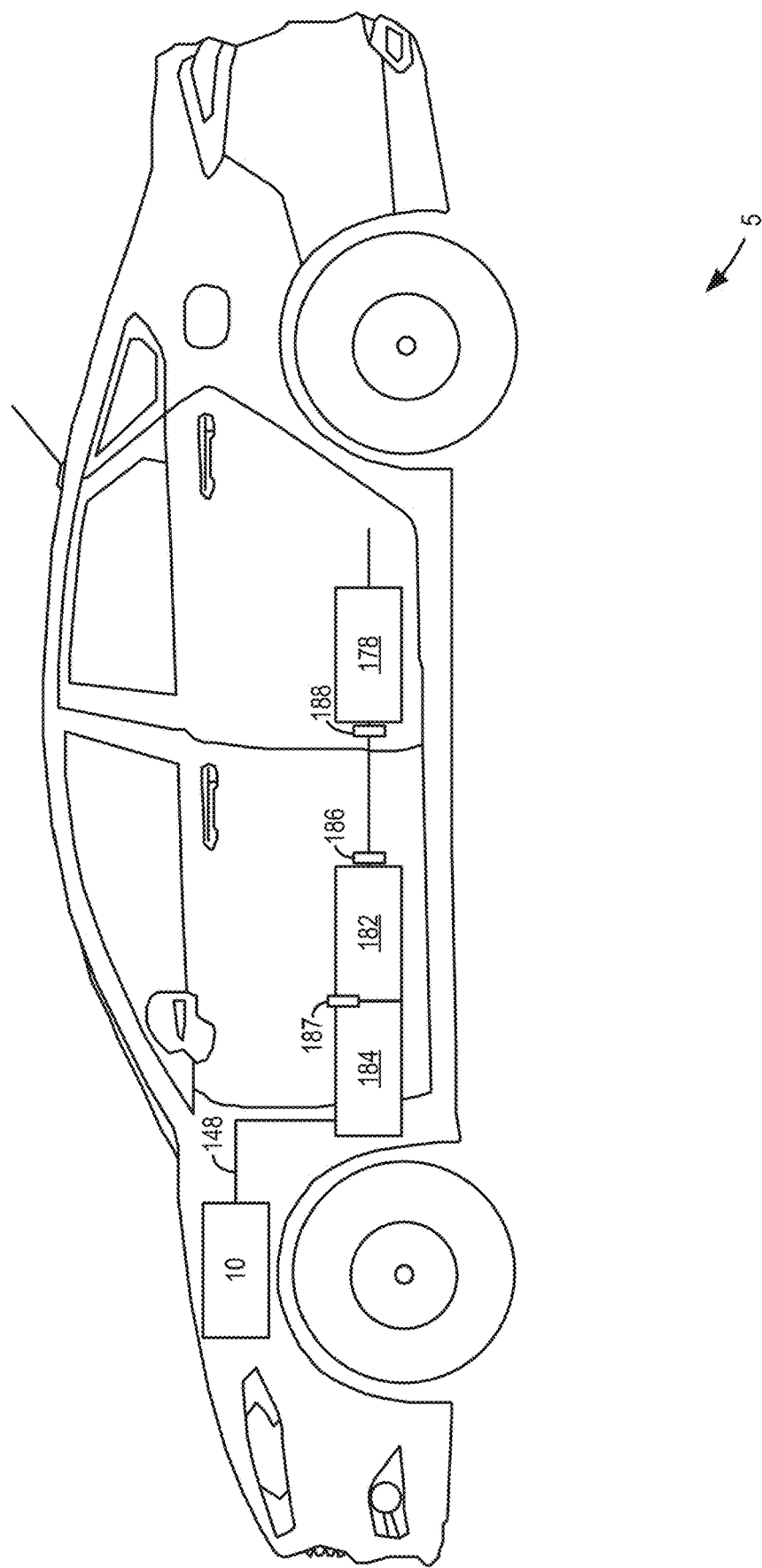
FIG. 2 shows a schematic diagram of an example emission control system within a vehicle.
Figure 3:
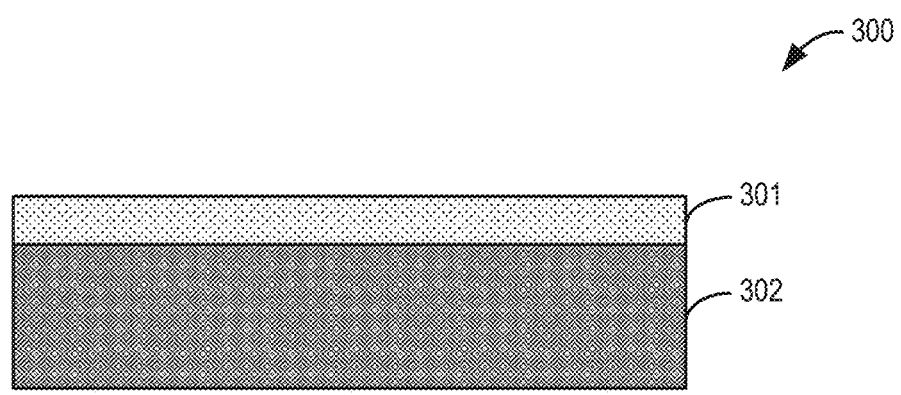
FIG. 3 shows a schematic illustration of a catalyst including nickel impregnated on a carrier surface.

The following description relates to systems and methods for an oxygen storage device arranged in a vehicle underbody. In one example, the oxygen storage device is arranged downstream of a close-coupled (CC) aftertreatment device and upstream of an underbody (UB) aftertreatment device, as shown in FIGS. 1 and 2. The CC aftertreatment device may be comprised of a base material coated in a three-way catalyst (TWC) layer. The UB aftertreatment device may be comprised of a base material coated in a TWC layer and/or a hydrocarbon (HC) and nitrogen oxide ($NO_x$) trap layer comprising a zeolite material modified with one or more platinum group metals (PGMs). The oxygen storage device may be comprised of a cordierite base material coated in a catalyst layer that includes a material having a high oxygen storage capability, such as nickel, as shown in FIG. 3, which may protect a trap layer in the UB aftertreatment device from degradation.

The added use of Ni-based oxygen storage catalysts to exhaust emission control systems complements conventional component catalysts. Ni provides a larger oxygen storage capacity than conventional ceria and/or zirconia and thereby may protect downstream catalysts from degradation via release of oxygen during fuel-rich air/fuel ratio (AFR) exhaust excursions. Theoretically, 1 g of Ni (59 g/mol) can provide $16.9 \times 10^{-3}$ mol oxygen. In practice, Ni has been shown to go through complete reduction and oxidation between Ni and NiO at 350° C. or above. Thus, the available amount of oxygen per gram of Ni can be up to one order of magnitude larger than the available amount of oxygen from conventional oxygen storage materials such as Ce, which has a maximum amount of $3.6 \times 10^{-3}$ mol oxygen per 1 g (140 g/mol).

In addition, by utilizing Ni on a carrier such as cordierite which contains no materials which are reactive with Ni, there is no potential negative interaction between Ni and reactive materials such as alumina. By using a Ni-based oxygen storage catalyst on a carrier which is free of reactive alumina or other reactive components, degradation of Ni is minimal during vehicle aging.

Figure 8:
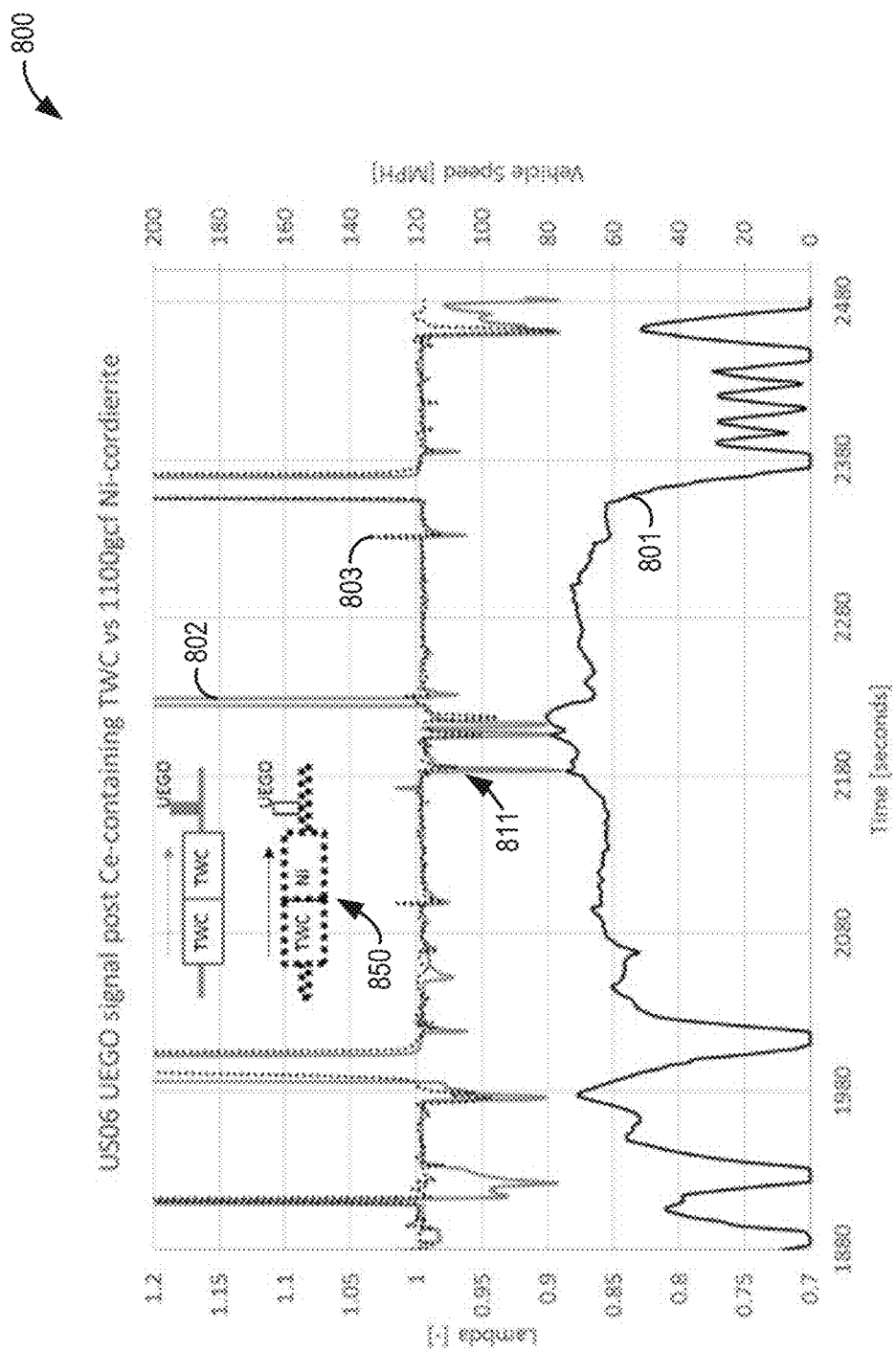
FIG. 8 shows an example plot of an air/fuel ratio of an exhaust gas over time and variable vehicle speeds.
Figure 9:
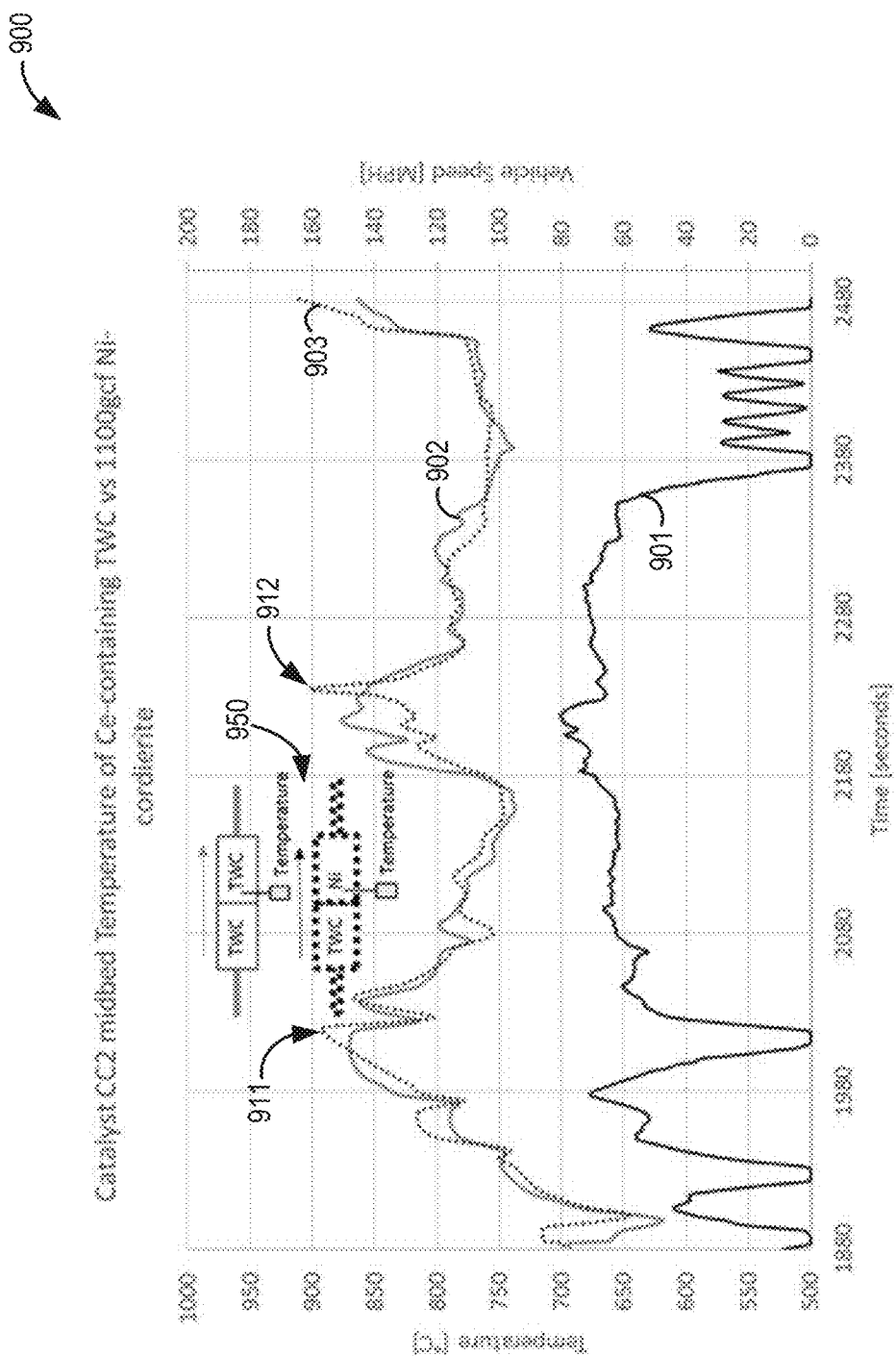
FIG. 9 shows an example plot of a temperature of an exhaust gas over time and variable vehicle speeds.

As an indication of the efficacy of Ni as an oxygen storage material, FIGS. 8-9 show changes in AFR and temperature resulting from the placement of a Ni-based oxygen storage device in an exhaust gas passage. In particular, AFR fluctuations measured downstream of the Ni-based oxygen storage device may indicate a change in an amount of oxygen in exhaust gas as a result of a catalytic activity of the Ni-based oxygen storage device, and temperature fluctuations measured at the location of the Ni-based oxygen storage device may indicate concurrent oxidations of the Ni.

Further, downstream catalysts which include a TWC layer and/or a HC and $NO_x$ trap layer such as the UB aftertreatment device described above benefit considerably from the presence of an oxygen storage material such as Ni. Accelerated degradation of such UB aftertreatment devices may occur during rich AFR excursions and/or high exhaust gas temperatures via sintering of trap materials such as PGM-modified zeolites. Reduction of the useful life of UB aftertreatment devices results in more untreated exhaust emissions, especially during times of lowered upstream catalytic activity such as immediately following vehicle cold starts.

Figure 4:
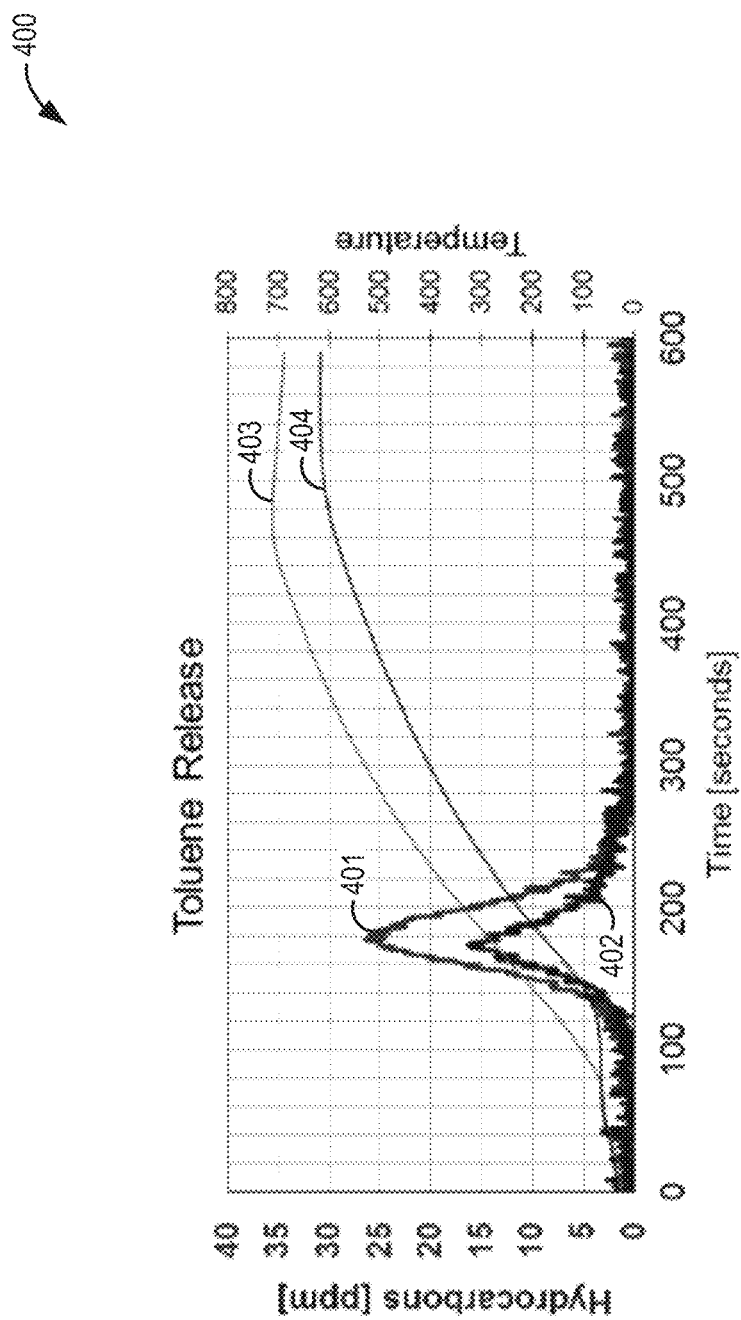
FIG. 4 shows an example plot of a concentration of toluene within emissions over time.
Figure 5:
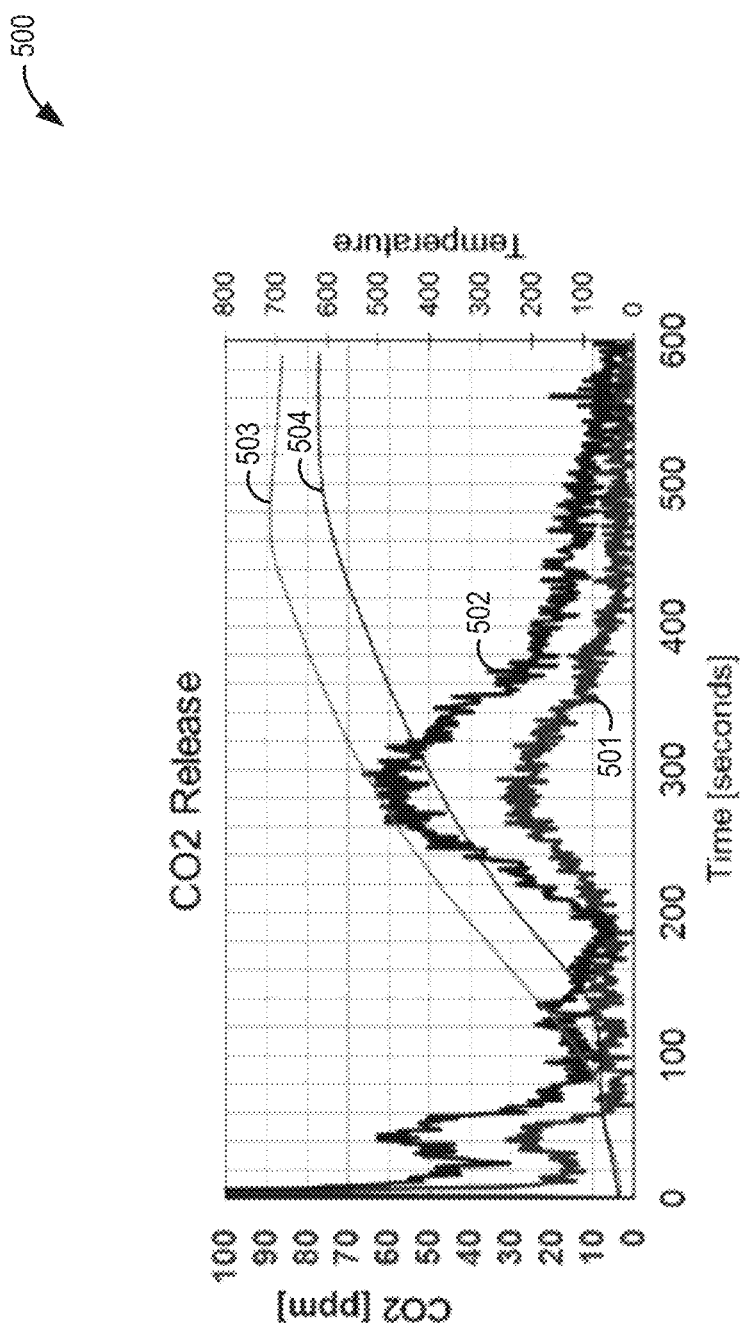
FIG. 5 shows an example plot of a concentration of carbon dioxide within emissions over time.

As an illustration, FIGS. 4-5 show changes in HC and carbon dioxide ($CO_2$) emissions ascribed to the placement of a Ni-based oxygen storage device upstream of an UB aftertreatment device. In particular, due to the inclusion of the Ni-based oxygen storage device upstream of the UB aftertreatment device prior to thermochemical deterioration in the exhaust stream (said another way, aging), active metal sites in a zeolite are shown to decrease release of stored unconverted HC emissions (FIG. 4) and increase release of stored HC emissions being converted to $CO_2$ (FIG. 5), as opposed to the UB aftertreatment device without use of the Ni-based oxygen storage device upstream.

While the presence of the Ni-based oxygen storage catalyst may prevent or delay degradation of the downstream UB aftertreatment device, it may be desirable to monitor both the Ni-based oxygen storage catalyst and the UB aftertreatment device for degradation in order to notify an operator of potential degradation or take mitigating action if degradation is predicted or confirmed. The monitoring of the UB aftertreatment device may take into account the state of the Ni-based oxygen storage catalyst. Indications of catalyst degradation may be based on oxygen content, temperature, and/or fuel composition of the exhaust passage. A controller may then interpret these data to determine the extent of degradation to the Ni-based oxygen storage catalyst or other downstream catalysts such as a zeolite-based trap catalyst. The monitoring system may then make adjustments to engine operating parameters and/or provide status indications of the one or more catalysts to the operator.

Figure 6:
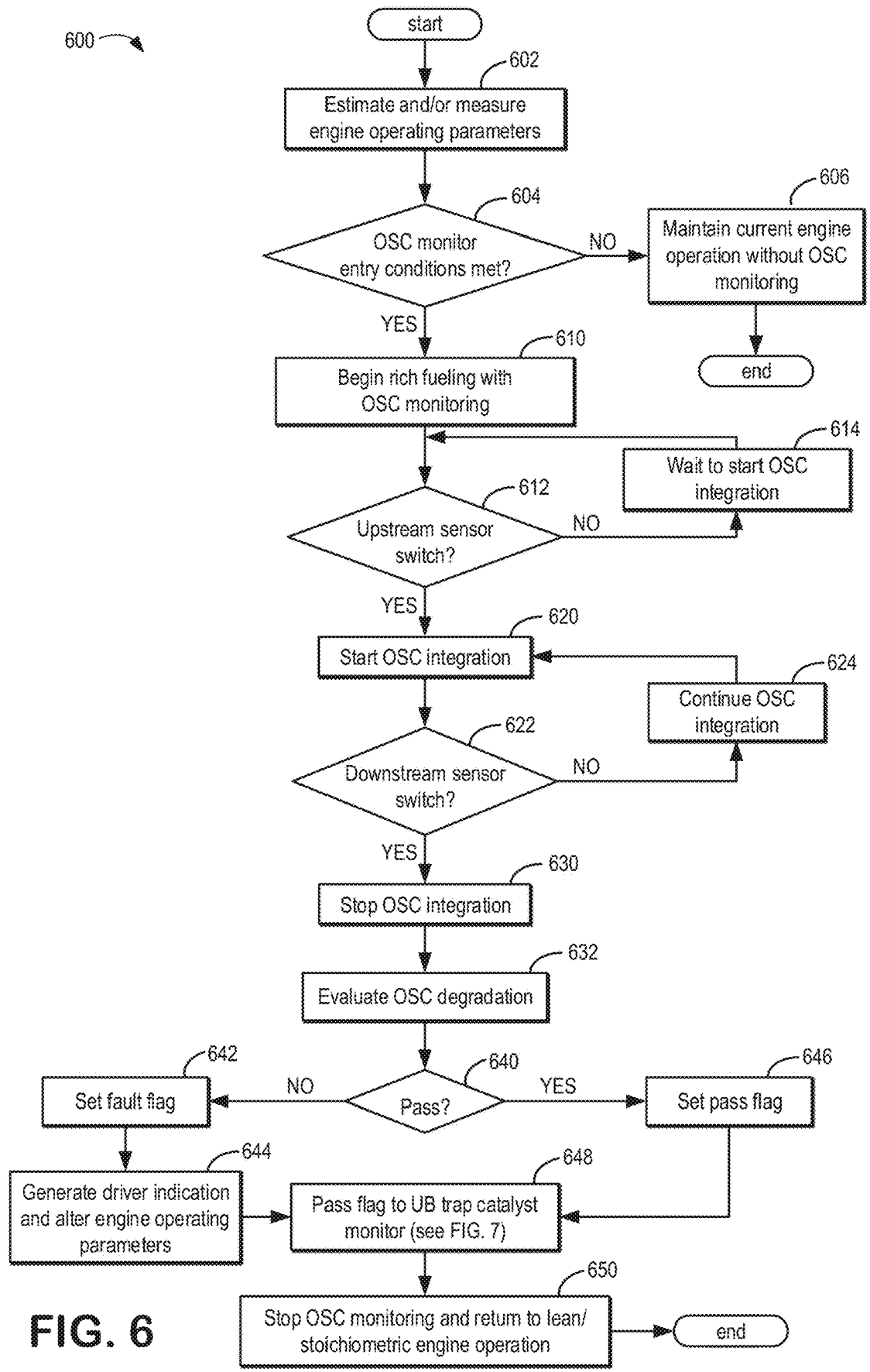
FIG. 6 shows a flow chart for an example method for monitoring degradation of nickel oxygen storage catalysts.
Figure 7:
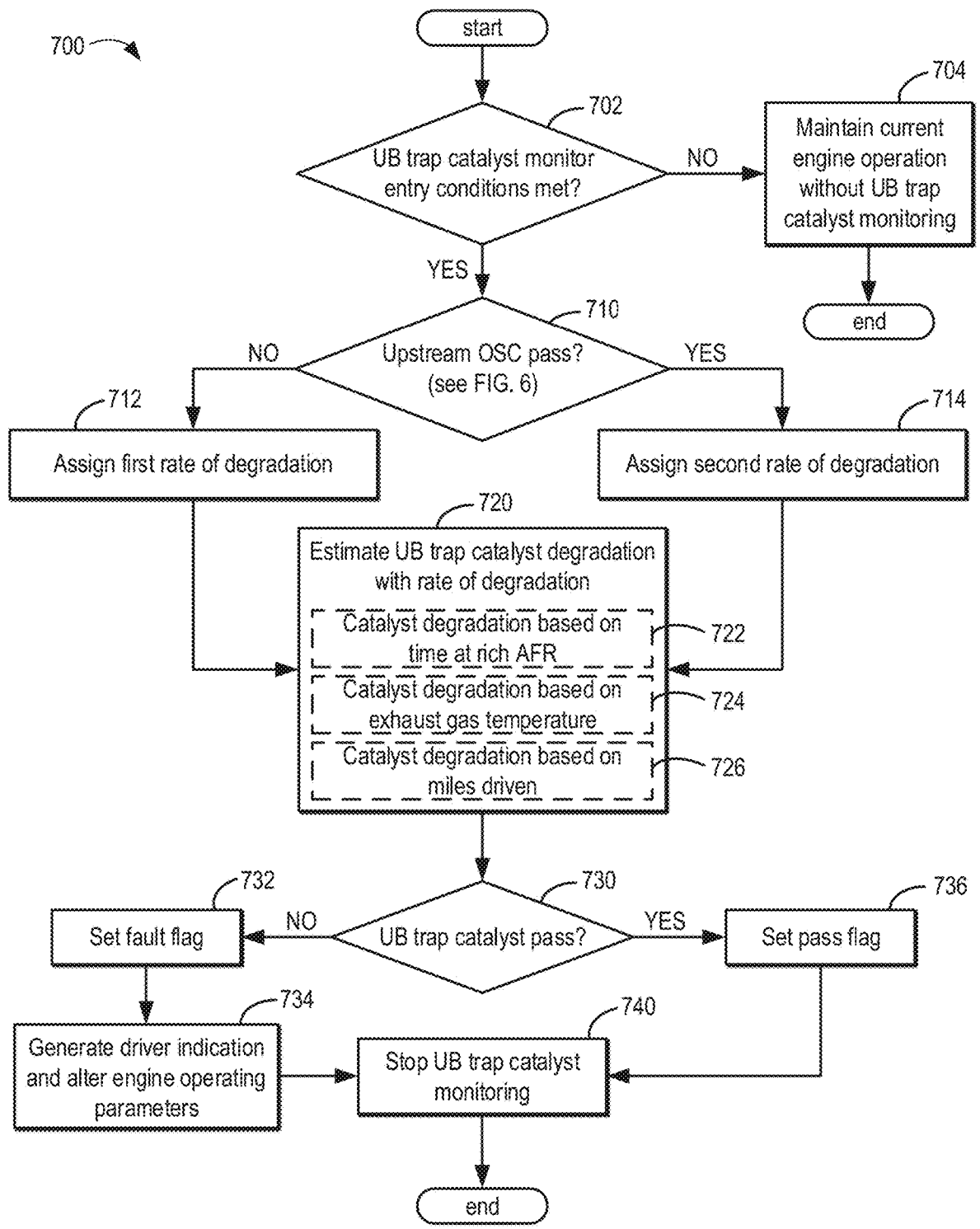
FIG. 7 shows a flow chart for an example method for monitoring degradation of underbody trap catalysts.

A method for monitoring the degradation of a Ni-based oxygen storage catalyst over the course of vehicle use is shown in FIG. 6. FIG. 7 shows a method for monitoring the degradation of an UB aftertreatment device as dependent on the degradation of an upstream Ni-based oxygen storage catalyst over the course of vehicle use. Feedback from the method of FIG. 6 may inform the UB aftertreatment device monitoring as to the degradation of an upstream Ni-based oxygen storage catalyst. The UB aftertreatment device monitoring may then adjust the monitoring of the UB aftertreatment device based on the degradation state of the Ni-based oxygen storage catalyst, for example by accelerating an estimated degradation of the UB aftertreatment device when the oxygen storage catalyst is determined to be degraded.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 depicts an example of a cylinder of internal combustion engine 10 included in an engine system 7 of vehicle 5. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder 14 (which may be referred to herein as a combustion chamber) of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. FIG. 1 shows engine 10 configured with a turbocharger 175 including a compressor 174 arranged between intake passages 142 and 144, and an exhaust turbine 176 arranged along exhaust passage 148. Compressor 174 may be at least partially powered by exhaust turbine 176 via a shaft 180. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178 (and upstream of first catalyst 184 and second catalyst 182). Sensor 128 may be selected from among various suitable sensors for providing an indication of exhaust gas air/fuel ratio (AFR) such as a linear oxygen sensor or UEGO (universal or wide-range exhaust gas oxygen), a two-state oxygen sensor or EGO (as depicted), a HEGO (heated EGO), a HC, CO, or $NO_x$ sensor, for example. Emission control device 178 may be a three way catalyst (TWC), HC trap, $NO_x$ trap, various other emission control devices, or combinations thereof.

In one example, the emission control device 178 is arranged in a far vehicle underbody (UB). Comparatively, this location may be downstream of a close-coupled (CC) catalyst location, such as the location of first catalyst 184. In this way, the first catalyst 184 is arranged upstream of the emission control device 178. In one example, the first catalyst 184 may be a TWC, particulate filter (PF), $NO_x$ diesel oxidation catalyst, the like, or combinations thereof.

A second catalyst 182 may be arranged in a location between the first catalyst 184 and the emission control device 178. In this way, the second catalyst 182 is arranged downstream of the first catalyst 184 and upstream of the emission control device 178. The second catalyst 182 may be closer to the first catalyst 184 than the emission control device 178. In one example, the second catalyst 182 may be a TWC, oxygen storage catalyst, or a combination thereof. In one example, the second catalyst 182 may be a Ni-based oxygen storage catalyst.

A difference between the CC location and the far vehicle UB location may include a distance from the engine, wherein the CC location is closer to the engine than the far vehicle UB location. That is to say, components in the CC close-coupled location are upstream of components in the far vehicle UB location. Additionally or alternatively, as will be described in greater detail with reference to FIG. 2, exhaust gas temperatures experienced by components in the CC location may be higher than temperatures experienced by components in the far vehicle UB position.

A first oxygen sensor 187 may be arranged between the first catalyst 184 and the second catalyst 182. A second oxygen sensor 186 may be arranged between the second catalyst 182 and the emission control device 178. The first oxygen sensor 187 may provide feedback to the controller 12 regarding an amount of oxygen present in an exhaust gas flow between the first catalyst 184 and the second catalyst 182. The second oxygen sensor 186 may provide feedback to the controller 12 regarding an amount of oxygen present in an exhaust gas flow between the second catalyst 182 and the emission control device 178. In some examples, feedback from the oxygen sensors 186 and/or 187 may be used by the controller 12 to detect degradation of the second catalyst 182 and notify the operator of any detected degradation. For example, the second catalyst 182 may be an oxygen storage catalyst which when degraded may allow more oxygen to pass through the exhaust passage 148 during lean AFR excursions than were it functioning at full capacity. The controller 12 may then determine degradation is present when feedback from the first oxygen sensor 187 and the second oxygen sensor 186 indicates that the second catalyst 182 is capturing less oxygen than might be expected were the second catalyst 182 functioning at full capacity. Further, the controller 12 may generate a notification to the operator indicating degradation of the second catalyst 182. Embodiments of this process will be described in greater detail with reference to FIG. 6.

A sensor 188 may be arranged between the second catalyst 182 and the emission control device 178. Sensor 188 may include a temperature sensor and/or an exhaust gas sensor. In some examples, sensor 188 may include an exhaust gas sensor such as a HC, CO, or $NO_x$; sensor. The sensor 188 may provide feedback to the controller 12 regarding the conditions of the exhaust gas flow between the second catalyst 182 and the emission control device 178. In some examples, feedback from the controller 12 may be used to notify the operator of degradation of the emission control device 178. For example, the emission control device 178 may include an UB trap catalyst which when degraded may allow more HC, CO, and/or $NO_x$; emissions to pass through the exhaust passage 148 than were it functioning at full capacity, and the second catalyst 182 when functioning at full capacity may further protect the emission control device 178 from degradation. Further, a monitoring method may be performed to determine whether the second catalyst 182 is degraded. The controller 12 may then determine degradation is present when further feedback from the sensor 188 indicates that emission control device 178 is capturing and converting less HC, CO, and/or $NO_x$; emissions than might be expected were the second catalyst 182 and the emission control device 178 each functioning at full capacity. The controller 12 may then generate a notification to the operator indicating degradation of the emission control device 178. Embodiments of this process will be described in greater detail with reference to FIG. 7.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 may provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Herein, operation of intake valve 150 may be described in greater detail. For example, the intake valve 150 may be moved from a fully open position to a fully closed position, or to any position therebetween. For all conditions being equal (e.g., throttle position, vehicle speed, pressure, etc.), the fully open position allows more air from the intake passage 146 to enter the cylinder 14 than any other position of the intake valve 150. Conversely, the fully closed position may prevent and/or allow the least amount of air from the intake passage 146 to enter the cylinder 14 than any other position of the intake valve 150. Thus, the positions between the fully open and fully closed position may allow varying amounts of air to flow between the intake passage 146 to the cylinder 14. In one example, moving the intake valve 150 to a more open position allows more air to flow from the intake passage 146 to the cylinder 14 than its initial position.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

The controller 12 receives signals from the various sensors of FIG. 1 and employs the various actuators of FIG. 1 to adjust engine operation based on the received signals and instructions stored on a memory of the controller. For example, adjusting engine operating parameters based on determined degradation of the second catalyst 182 and/or the emission control device 178 may include adjusting fuel injector 170 and/or injector 166, adjusting throttle 162, and so forth.

Turning now to FIG. 2, it shows the vehicle 5 of FIG. 1. As such, components previously introduced may be similarly numbered in subsequent figures. The vehicle 5 comprises the engine 10, which is fluidly coupled to the first catalyst 184, the second catalyst 182, and the emission control device 178 via exhaust passage 148. As described above, the first catalyst 184 may be arranged in the close-coupled (CC) position, the emission control device 178 may be arranged in the far vehicle underbody (UB), and the second catalyst 182 may be arranged between the first catalyst 184 and the emission control device 178.

The first catalyst 184 may be positioned in the exhaust passage 148 at a close-coupled distance downstream of the engine 10, such as in a range of 13-33 cm downstream of the engine 10. The emission control device 178, which is downstream of the first catalyst 184, may be downstream of the first catalyst 184 by a suitable distance, such as a distance of 25 cm or more. The first catalyst 184 and the emission control device 178 may each include a three-way catalyst (TWC) layer. The second catalyst 182, which is downstream of the first catalyst 184 and upstream of the emission control device 178 within the exhaust passage 148, may be placed at any location between first catalyst 184 and emission control device 178.

The emission control device 178 may experience exhaust gas temperatures lower than temperatures experienced by the first catalyst 184. As an example, the first catalyst 184 may experience exhaust gas temperatures between 840 to 880° C. while the emission control device 178 may experience exhaust gas temperatures between 740 to 840° C. This temperature difference may result in the first catalyst 184 degrading more quickly than the emission control device 178. As such, after a threshold number of miles where the first catalyst 184 is likely to be degraded, the vehicle 5 may rely more on the emission control device 178 to treat and/or trap HC and/or $NO_x$ emissions, especially during cold-start conditions. The threshold number of miles may be based on a number of miles driven (e.g., 150,000 miles) by the vehicle that may be associated with a decrease in catalytic activity of the first catalyst 184 large enough to no longer decrease emissions to a desired amount. Thus, degradation of the first catalyst 184 may include a reduction in catalytic activity to a degree such that the first catalyst 184 does not treat exhaust gas emissions to the desired amount.

The emission control device 178 may include a HC and/or $NO_x$; trap, wherein the trap may comprise a porous zeolite with one or more precious or base transition metals that may be coated onto the zeolite or may be impregnated therein. In some examples, the trap may include adsorbent material which may be relatively acidic to store emissions of HCs and water from the engine. As an example, the trap adsorbent material may comprise an aluminosilicate zeolite with a ratio of Si to $Al_2$ of less than 40. Additionally or alternatively, the trap may further comprise one or more metals to assist in the adsorption and conversion of HCs and water. For example, the zeolite may comprise a framework, exchanged or impregnated metals, where the metals provide acidity or water adsorption features even though the zeolite framework Si/$Al_2$ is greater than 40 and would otherwise have limited or no affinity for water. In some examples, the zeolite may comprise a ratio of Si to $Al_2$ being less than 40 and one or more metals configured to assist in water adsorption. The ratio of Si to $Al_2$ may be between 5 and 40. In some embodiments, the ratio of Si to $Al_2$ may be between 5 and 20. In some embodiments, the ratio of Si to $Al_2$ may be between 5 and 10.

The trap zeolite may comprise a washcoat comprising 20 to 100 g/ft$^3$ of precious group metals (PGM), wherein a majority of the composition of the PGM is Pd. In some embodiments, the washcoat may comprise 20 to 70 g/ft$^3$ of PGM. In some embodiments, the washcoat may comprise 30 to 60 g/ft$^3$ of PGM. In one example, there is exactly 50 g/ft$^3$ of PGM. The PGM may include greater than 50% Pd. In some embodiments, additionally or alternatively, the PGM includes between 50 to 100% Pd. In some embodiments, additionally or alternatively, the PGM includes between 70 to 100% Pd. Additionally or alternatively, in some embodiments, the PGM includes between 85 to 95% Pd. In one example, there is at least 94% Pd in the PGM washcoat.

The emission control device 178 may include a TWC, wherein the TWC may comprise a high loading and dispersion of catalytically active materials, including but not limited to one or more of Rh, Pd, Cu, and Ag. While ionic Pd in zeolites may store NOR in lean (diesel) exhaust gas applications, Rh may be preferred over Pd in stoichiometric (gasoline) exhaust gas applications since reduced Pd prefers to adsorb CO rather than NOR, unlike Rh. These metals may be introduced via spraying a washcoat onto a zeolite of the emission control device 178, zeolite ion-exchange, and/or impregnation. These catalytically active materials may be capable of forming chemisorbed NOR, such as nitrosyl species (e.g., Pd—NO) or dissociated species (e.g., Rh—N and Rh—O). The catalytically active materials may release and/or desorb the NOR compounds upon reaching a catalytic reduction temperature of NOR. In one example, the catalytic reduction temperature is 200° C. Therefore NOR is reduced to $N_2$ in conjunction with reductant (i.e., CO, HC) present in sub-stoichiometric exhaust gas in the far UB location. Said another way, the NOR compounds may be released from the TWC after being reduced. In one example, the NOR is not released from the TWC until it has been reduced to $N_2$.

In one example, the emission control device 178 may comprise a passive NOR adsorber (PNA) coated with TWC materials and 50 g/ft$^3$ PGM (Pd/Rh) distributed over the adsorbent and TWC washcoats. The TWC may comprise 150 g/ft$^3$ PGM (Pd/Rh). The PNA of the emission control device 178 may function to capture water in an exhaust gas flow, thereby enabling the TWC to capture NOR.

In some embodiments, the emission control device 178 may comprise 2-7 g/in$^3$ of the zeolite trap material described above, 1-4 g/in$^3$ of TWC material 0.01 to 10 wt % base transition metals, and 1-200 g/ft$^3$ platinum group metals, where the base transition metals and/or the platinum group metals may abet HC and/or NOR trapping. In one example, the emission control device 178 comprises exactly 4.5 g/in$^3$ of zeolite material, 2.5 g/in$^3$ of TWC material, 1 wt % base transition metals, and 100 g/ft$^3$ platinum group metals, where the base transition metals and/or the platinum group metals may abet HC and/or NOR trapping. Within the emission control device 178, the TWC material may be substantially identical or different than the trap materials. For example, the TWC material may comprise barium hydroxide, while the trap materials may not. Barium hydroxide may promote NOR adsorption while degrading HC oxidation capabilities. With regards to precious metals, the trap materials may comprise a greater proportion of Pd and/or Pt whereas the TWC material may comprise a greater proportion of Rh. Thus, the differences between the two may arise based on a favorability to capture NOR, which may be associated with the TWC material, and a favorability to oxidize HCs, which may be associated with the trap materials.

In one example, the first catalyst 184 and the second catalyst 182 may be directly coupled to one another (e.g., without intervening segments of exhaust passage). For two separately coated monolith substrates, an outlet of the first catalyst 184 and an inlet of the second catalyst 182 may be in face-sharing contact. Alternatively the first catalyst 184 and the second catalyst 182 may be zone-coated on the same monolith substrate with materials comprising first catalyst 184 in the front zone and materials comprising second catalyst 182 in the rear zone. In other examples, the first catalyst 184 and the second catalyst 182 may be spaced apart by an intervening exhaust passage segment, for example.

In one example, the second catalyst 182 and the emission control device 178 may be directly coupled to one another (e.g., without intervening segments of exhaust passage). For two separately coated monolith substrates, an outlet of the second catalyst 182 and an inlet of the emission control device 178 may be in face-sharing contact. Alternatively the second catalyst 182 and the emission control device 178 may be zone-coated on the same monolith substrate with materials comprising second catalyst 182 in the front zone and materials comprising emission control device 178 in the rear zone. In other examples, the second catalyst 182 and the emission control device 178 may be spaced apart by an intervening exhaust passage segment, for example.

In one example, a first oxygen sensor 187 may be arranged between the first catalyst 184 and the second catalyst 182 as shown. Alternatively, a gap may be arranged between the first catalyst 184 and the second catalyst 182, wherein the first oxygen sensor 187 may be arranged in the gap.

In one example, a second oxygen sensor 186 may be arranged between the second catalyst 182 and the emission control device 178 as shown. Alternatively, the shown gap between the second catalyst 182 and the emission control device 178 may be absent, wherein the second oxygen sensor 186 may be arranged between the second catalyst 182 and the emission control device 178.

In one example, the vehicle 5 may further comprise a sensor 188 arranged downstream of the second catalyst 182 and upstream of the emission control device 178, wherein sensor 188 may include a temperature sensor and/or an exhaust gas sensor such as a HC, CO, or $NO_x$; sensor.

In one example, engine operating parameters may be adjusted based on feedback from one or more of the oxygen sensors 186, 187, and the sensor 188. For example, if the emission control device 178 is determined to be degraded beyond a threshold via a catalyst monitoring feedback loop, and the sensor 188 comprises an exhaust gas sensor which indicates that the degraded emission control device 178 is under fuel-rich conditions, then engine operating parameters may be adjusted to enable faster return to stoichiometric operating conditions than in the case in which the emission control device 178 is not degraded. These adjustments along with other adjustments based on feedback from the oxygen sensors will be described in greater detail below with reference to FIGS. 6-7.

Referring now to FIG. 3, a catalyst 300 is shown, wherein catalyst 300 includes oxygen storage material 301 loaded on a carrier surface 302. The catalyst 300 is a non-limiting example of second catalyst 182 of FIGS. 1-2 and as such the catalyst 300 may function as an oxygen storage catalyst in an exhaust passage. The catalyst 300 may then provide protection from degradation to a downstream emission control device including a three-way catalyst and/or trap catalyst such as emission control device 178 (as shown in FIGS. 1-2). Suitable oxygen storage materials for use include nickel, iron, cerium, or combinations thereof. Suitable carriers for use include cordierite, zirconium oxide, silicon carbide, or silica gel. In an embodiment, nickel may be loaded onto the carrier surface via a nickel solution of about 0.05 to 0.30 g Ni/g-solution. The nickel solution may comprise nickel nitrate, nickel acetate, nickel carbonate, nickel sulfate, or combinations thereof. While the catalyst is shown as a separate layer, it should be appreciated that the catalyst may also be impregnated throughout pores in the carrier body. In one example, a nickel solution may be impregnated directly into the carrier which is provided in the form of a honeycomb substrate. Alternatively, a nickel solution may be impregnated on powders that are washcoated onto a honeycomb substrate.

The catalyst-impregnated carrier is dried and calcined prior to use. The impregnated carrier substrate may be dried at a temperature between about 100° C. and 250° C. for about 1 hour and then calcined at a temperature between about 350° C. and 650° C. for about 1 hour. The total amount of catalyst may be loaded in one step or by repeating the impregnation, drying, and calcining steps to build up to a desired level of catalyst loading.

In order to enhance the properties of the catalyst, promoters may be added to the catalyst-impregnated carrier. Suitable promoters include platinum, palladium, rhodium, copper, chromium, manganese, and/or cobalt. The promoters may be added to the catalyst-impregnated carrier in solution by wet impregnation.

As described above, catalyst 300 may be positioned upstream of an underbody trap catalyst, such as emission control device 178 of FIGS. 1-2, in order to prevent or reduce degradation of the underbody trap catalyst by releasing oxygen during fuel-rich exhaust gas conditions. Thus, the oxygen storage material 301 may be selected based on the oxygen storage capacity of the material, for example material having a highest oxygen storage capacity may be selected. As described previously, the oxygen storage material 301 may include nickel, iron, cerium, or combinations thereof. The amount of nickel, iron, and/or cerium may be as high as possible, in order to maximize the oxygen storage capacity of the catalyst 300. For example, the catalyst 300 may include 10% nickel weight per weight, or higher, such as 12% nickel. The high oxygen storage capacity provided by the nickel-based oxygen storage material at the given % weight may allow for release of oxygen at rich AFR, and in particular at rich AFR when exhaust gas temperature is relatively high (e.g., at or above 500° C.).

Referring now to FIGS. 8 and 9, tests were conducted on two aged catalyst systems, each of the tests being conducted on only one of the aged catalyst systems. Each of the aged catalyst systems was placed in an exhaust gas passage of a test vehicle and each of the tests passed an equivalent exhaust gas stream over said aged catalyst system. Further, each of the aged catalyst systems included a close-coupled (CC) three-way catalyst TWC device placed upstream of a second catalyst device. In one of the aged catalyst systems, the second catalyst device was a Ni-based oxygen storage device. In the other aged catalyst system, the second catalyst device was a second TWC device, wherein the second TWC device contained a weight of ceria, the weight of ceria being comparable to a weight of Ni in the Ni-based oxygen storage device. Each of the Ni-based oxygen storage device and the second TWC device was coated on a cordierite base. The resultant systems were tested for air/fuel ratio (AFR) and temperature fluctuations. Differences between the two aged catalyst systems were thus ascribed to a presence of the Ni-based oxygen storage device in one of the aged catalyst systems. In some examples, the Ni-based oxygen storage device may be second catalyst 182 of FIGS. 1-2 and/or catalyst 300 of FIG. 3.

Tests were conducted on the aged catalyst systems during test vehicle operation. The abscissa of plots 800 and 900 each indicate a duration of time selected for data sampling. Curves 801 and 901 each plot vehicle speed over the duration of time selected for data sampling. In one example, a universal exhaust gas oxygen (UEGO) sensor was placed downstream of each of the Ni-based oxygen storage device and the second TWC device (UEGO sensor placements are shown in inset schematic 850). Curves 802 and 803 plot data collected from the UEGO sensor for the aged catalyst system containing the second TWC device and the aged catalyst system containing the Ni-based oxygen storage device, respectively. In another example, a temperature sensor was placed at each of the Ni-based oxygen storage device and the second TWC device (temperature sensor placements are shown in inset schematic 950). Curves 902 and 903 plot data collected from the temperature sensor for the aged catalyst system containing the second TWC device and the aged catalyst system containing the Ni-based oxygen storage device, respectively.

FIG. 8 shows AFRs of the aged catalyst systems for the duration of time selected for data sampling. When fuel-rich AFRs (wherein the AFR, as indicated by the left ordinate, was less than 1) were recorded by the UEGO sensor, the aged catalyst system including the Ni-based oxygen storage device was more effective at dampening a deviation of the AFR from 1 than was the aged catalyst system including the second TWC device, indicating catalytic activity by the Ni-based oxygen storage device. For example, peak 811 in curve 803 relative to curve 802 indicates an AFR regulated by the Ni-based oxygen storage device.

FIG. 9 shows temperatures of the aged catalyst systems for the duration of time selected for data sampling. At times of about 1991 and 2225 s (peaks 911 and 912, respectively, in curve 903), fuel shutoff events occurred. During the fuel shutoff events, increased air in the exhaust gas passage provided increased oxygen to the CC TWC device and the second catalyst device. In the aged catalyst system in which the second catalyst device was the Ni-based oxygen storage device, the increased oxygen in the exhaust gas passage oxidized Ni in the Ni-based oxygen storage device in an exothermic redox reaction. At higher temperatures, such as greater than 800° C., the Ni-based oxygen storage device underwent oxidation, releasing heat into the exhaust gas passage. Peaks 911 and 912 in curve 903 relative to curve 902 indicate the released heat.

Thus, inclusion of a Ni-based oxygen storage device in an exhaust treatment system may result in dampening of fuel-rich AFR spikes due to the Ni-based oxygen storage device more efficiently storing oxygen than an exhaust treatment system including only one or more TWC devices. Further, an oxygen storage capacity of the Ni-based oxygen storage device may be due to an exothermic redox reaction, in which oxidation of Ni in the Ni-based oxygen storage device may release heat into a surrounding exhaust gas passage.

Referring now to FIGS. 4 and 5, two hydrocarbon (HC) trap coated monolith sample cores were each exposed to a laboratory reactor rapid aging simulation and placed downstream of a three-way catalyst (TWC) sample core; one laboratory reactor rapid aging simulation had a Ni-coated cordierite sample core placed directly downstream of the TWC sample core while another laboratory reactor rapid aging simulation did not. In some examples, a system including the Ni-coated cordierite sample core may be representative of the multicomponent exhaust aftertreatment device described in FIGS. 1-3. In each case, the HC trap coated monolith sample core comprised a modified zeolite material containing one or more platinum group metals (PGMs) coated with a TWC washcoat containing one or more PGMs. The resultant systems were tested for HC oxidation potential and compared to results for analogous systems which did not include Ni-coated cordierite sample cores.

Results of the laboratory reactor rapid aging simulations are shown in FIGS. 4 and 5. Plot 400 of FIG. 4 depicts results for toluene release following treatment of the toluene by a TWC sample core and an unprotected HC trap coated monolith sample core (as shown by spectrum 401), and following treatment of the toluene by a TWC sample core and a protected HC trap coated monolith sample core, wherein the HC trap coated monolith sample core is protected by an upstream Ni-coated cordierite sample core (as shown by spectrum 402). Plot 500 of FIG. 5 depicts results for carbon dioxide ($CO_2$) release following HC emission treatment by a TWC sample core and an unprotected HC trap coated monolith sample core (as shown by spectrum 501), and following HC emission treatment by a TWC sample core and a protected HC trap coated monolith sample core, wherein the HC trap coated monolith sample core is protected by an upstream Ni-coated cordierite sample core (as shown by spectrum 502).

All samples were preconditioned in an aging environment in the oven at 760° C. fed with a simulated cold-start exhaust blend and injected oxygen control that increased the reaction temperature over the samples from 740 to 840° C. in 1 minute cycles for a 50 hour duration. In the tests in which no protection was afforded by an upstream Ni-coated cordierite sample core, this procedure produced full useful life level degradation for the HC trap coated monolith sample cores described above.

Sample systems were comprised of aged samples being placed in a flow tube being connected to an oven. TWC sample cores were placed just outside of a heating zone of the oven. HC trap coated monolith sample cores were place 84 mm downstream of the TWC sample cores. In the tests in which a Ni-coated cordierite sample core was incorporated, the Ni-coated cordierite sample core was placed directly downstream of a TWC sample core. To test catalytic activities of the aged samples, the aged samples were cooled to 30° C. and then subjected to temperature ramping at 80° C./min to 600° C. Inlet temperatures (curve 403 of FIG. 4 and curve 503 of FIG. 5) and outlet temperatures (curve 404 of FIG. 4 and curve 504 of FIG. 5) of a sample system for the duration of a test are plotted in plot 400 of FIG. 4 and plot 500 of FIG. 5. An infrared analyzer was used downstream of the sample system to measure toluene and $CO_2$ emissions (as show in spectra 401 and 402 of FIG. 4 and spectra 501 and 502 of FIG. 5, as described above).

FIG. 4 shows temperature programmed release of an equivalent amount of stored toluene in two HC trap coated monolith sample cores, only one of the HC trap coated monolith sample cores being aged downstream of a Ni-coated cordierite sample core. The HC trap coated monolith sample core tested without inclusion of the Ni-coated cordierite sample core released more stored toluene than when the Ni-coated cordierite sample core was employed. PGM sites in the modified zeolite material provided chemical adsorption sites that held toluene at higher temperatures than other weak physical adsorption sites in the modified zeolite material. When the PGM sites sinter and become deactivated by rich, hot exhaust exposure, the toluene can only be stored in the weak physical adsorption sites of the modified zeolite material. In particular, comparison of spectra 401 and 402 indicates that the HC trap coated monolith sample core protected by the upstream Ni-coated cordierite sample core was able to decrease low temperature release of stored toluene after being subjected to the laboratory reactor rapid aging simulation than the unprotected HC trap coated monolith sample core after being subjected to the laboratory reactor rapid aging simulation. Any stored toluene not released at a temperature below 200° C. can be oxidized to $CO_2$ and $H_2O$ by the PGM sites in the modified zeolite material or in the TWC washcoat. Accordingly, these results indicate that the upstream Ni-coated cordierite sample core protects the HC trap coated monolith sample core from useful life degradation via the regulation of exhaust air/fuel ratios (AFRs), for example by releasing oxygen during fuel-rich exhaust gas conditions.

FIG. 5 shows that the HC trap coated monolith sample cores tested without the inclusion of the Ni-coated cordierite sample core released less $CO_2$ than when the Ni-coated cordierite sample core was employed during the laboratory reactor rapid aging simulations. In particular, comparison of spectra 501 and 502 indicates that the HC trap coated monolith sample core protected by the upstream Ni-coated cordierite sample core was able to convert more HC emissions to $CO_2$ after being subjected to aging than was the unprotected HC trap coated monolith sample core after being subjected to aging. Accordingly, these results indicate that the upstream Ni-coated cordierite sample core protects the HC trap coated monolith sample core from useful life degradation via the regulation of exhaust AFRs.

Thus, an oxygen storage catalyst including a high amount of high oxygen storage capacity material (such as nickel) may be placed in front of a trap catalyst comprised of metal-modified zeolites. In doing so, the oxygen storage catalyst may store oxygen that may then be released during periods where rich, hot exhaust gas is flowing through the exhaust system. The released oxygen may increase the AFR of the exhaust gas passed to the trap catalyst, thereby reducing or delaying degradation of the trap catalyst caused by exposure to rich, hot exhaust gas. In this way, regulated emissions may be maintained at low levels over the lifetime of a vehicle, even if an upstream TWC (which is exposed to even higher exhaust gas temperatures) degrades.

Referring now to FIG. 6, an example routine 600 is shown for monitoring a state of degradation of an oxygen storage catalyst (OSC), wherein the OSC may be second catalyst 182 of FIGS. 1-2 and/or catalyst 300 of FIG. 3. Instructions for carrying out routine 600 and the rest of the methods included herein may be executed by a controller based on instructions stored on a memory of the controller and in conjunction with signals received from sensors of the engine system, such as the sensors described above with reference to FIGS. 1-2. In particular, first oxygen sensor 187 and second oxygen sensor 186 may supply feedback to controller 12. Further, the controller may employ engine actuators of the engine system to adjust engine operation, according to the methods described below. In reference to FIGS. 1-2, this may include, as a non-limiting example, regulating an exhaust air/fuel ratio (AFR) by adjusting ignition timing via ignition system 190 and/or reducing fuel injection via electronic driver 168 and/or electronic driver 171.

At 602, engine operating parameters may be estimated and/or measured. For example, engine operating parameters such as engine speed, fuel injection amount, ignition timing, throttle position, engine load, and/or engine torque output may be estimated and/or measured.

At 604, routine 600 may determine whether OSC monitor entry conditions are met. The OSC monitor entry conditions may be based on various engine operating parameters such as those estimated and/or measured at 602. In particular, engine operating parameters such as engine speed, vehicle speed, fuel injection, engine load, and/or engine torque output may be utilized to determine whether the OSC monitor entry conditions have been met at 604. In one example, the OSC monitor entry conditions may include the engine being operated with sufficiently lean AFR for a sufficient duration to saturate the OSC with oxygen. In one example, the lean AFR operating condition may include a deceleration fuel shutoff (DFSO) operation lasting a threshold duration and thus the OSC monitor entry conditions may include exit out of the DFSO operation.

If the OSC monitor entry conditions are not met, for example if a DFSO duration has not been completed, routine 600 may progress to 606 to maintain current engine operation without OSC monitoring and routine 600 ends. Thus, OSC monitoring may not occur. If, however, the OSC monitor entry conditions are met at 604, for example, if a DFSO duration has been completed, routine 600 may progress to 610 where rich fueling begins and OSC monitoring is initiated. Rich fueling may be initiated in response to a driver tip-in to exit out of DFSO, for example.

At 612, routine 600 may confirm if an upstream sensor has switched based on an AFR upstream of the OSC being richer than a threshold. In particular, the upstream sensor may be an oxygen sensor located upstream of the OSC such as first oxygen sensor 187 (as shown in FIGS. 1-2). In one example, the upstream sensor indicating that the AFR is richer than a threshold may include the upstream sensor switching from reading lean to reading rich. In another example, the upstream sensor indicating that the AFR is richer than a threshold may include the upstream sensor switching from reading lean to reading less lean based on a threshold value. If it is determined that the upstream sensor has not switched, for example if the upstream sensor does not indicate that the AFR is richer than a threshold, routine 600 may progress to 614 to wait to start an OSC integration calculation (as shown below). If, on the other hand, the upstream sensor has switched, for example if the upstream sensor indicates that the AFR is richer than a threshold, routine 600 may progress to 620 to start the OSC integration calculation. By waiting until the upstream sensor has switched before commencing the OSC integration calculation, fuel mass that is being stored in the upstream TWC and not being supplied to the OSC may be discarded from the integration calculation.

At 622, routine 600 may confirm if a downstream sensor has switched based on an AFR downstream of the OSC being richer than a threshold. In particular, the downstream sensor may be an oxygen sensor located downstream of the OSC such as second oxygen sensor 186 (as shown in FIGS. 1-2). In one example, the downstream sensor indicating that the AFR is richer than a threshold may include the downstream sensor switching from reading lean to reading rich. In another example, the downstream sensor indicating that the AFR is richer than a threshold may include the downstream sensor switching from reading lean to reading less lean based on a threshold value. If it is determined that the downstream sensor has not switched, for example if the downstream sensor does not indicate that the AFR is richer than a threshold, routine 600 may progress to 624 to continue the OSC integration calculation. If, on the other hand, the downstream sensor has switched, for example if the downstream sensor indicates that the AFR is richer than a threshold, routine 600 may progress to 630 to stop the OSC integration calculation. The downstream sensor switch indicates that fuel/fuel products in the exhaust gas are no longer being converted in the OSC, thus indicating the stored oxygen in the OSC has been depleted.

The OSC integration calculation may identify an oxygen storage capacity of the OSC via integration of the fuel mass passing to the OSC. The fuel mass integration may begin following the switch of the upstream sensor (612, above) and the fuel mass integration may end following the switch of a downstream sensor (622, above). The integrated fuel mass may be directly correlated to an amount of oxygen being stored by the OSC from which the oxygen storage capacity of the OSC may be determined. In this way, and in contrast to indirect monitoring approaches, detection of much smaller relative changes in the oxygen storage capacity of the OSC may be achieved.

At 632, routine 600 may evaluate the state of degradation of the OSC based on the oxygen storage capacity of the OSC. The oxygen storage capacity of the OSC may be an estimation based on the integrated fuel mass as determined by the OSC integration calculation. The estimation of the oxygen storage capacity of the OSC may therefore be based on an amount of oxygen stored by the OSC which may be determined from the integrated fuel mass as described above. In one example, the state of degradation of the OSC may be based on a threshold value of the oxygen storage capacity of the OSC. For example, the OSC may be determined to be degraded responsive to the determined oxygen storage capacity being less than a threshold capacity. In another example, the state of degradation of the OSC be a value indicative of a level of the degradation, such as the oxygen storage capacity of the OSC.

At 640, routine 600 may determine whether the state of degradation of the OSC has surpassed a threshold. If it is determined that the OSC has degraded or that the OSC has degraded past a threshold, routine 600 may progress to 642 to set a fault flag. In some examples, the fault flag may be a binary flag that only indicates that the OSC is degraded, which may be determined based on the oxygen storage capacity of the OSC being lower than a threshold. For example, the OSC may be determined to be degraded when the oxygen storage capacity is 50% or less than the oxygen storage capacity of a fresh OSC. In another example, the fault flag may include an extent of degradation of the OSC. For example, the fault flag may indicate a level of the oxygen storage capacity of the OSC, such as a proportional value relative to a fresh OSC (e.g., 75 or 50% of the oxygen storage capacity of a fresh OSC). Routine 600 may then progress to 644 to generate a driver indication of the state of degradation of the OSC, store a diagnostic code, and/or to alter engine operating parameters. For example, the driver indication may include lighting a malfunction indicator lamp and the diagnostic code may be set and stored in memory by the controller. Further, the engine operating parameters may be altered to regulate the AFR to prevent or mitigate further OSC degradation and/or to prevent or reduce rich exhaust excursions (particularly at high exhaust gas temperatures) that may lead to degradation of the downstream UB trap catalyst. The engine operating parameters may include, for example, engine speed, vehicle speed, fuel injection, engine load, and/or engine torque output.

If, on the other hand, it is determined that the OSC has not degraded or that the OSC has not degraded past a threshold, routine 600 may progress from 640 to 646 to set a pass flag. In some examples, the pass flag may include a value indicating an extent of aging of the OSC (e.g., 90% of the oxygen storage capacity of a fresh OSC). In other examples, the pass flag may be a binary flag that only indicates that the OSC is not degraded, which may be determined based on the oxygen storage capacity of the OSC being greater than a threshold. For example, the OSC may be determined to be not degraded when the oxygen storage capacity is greater than 50% of the oxygen storage capacity of a fresh OSC. At 648, upon receipt of a fault flag or a pass flag, routine 600 may pass said flag to an underbody (UB) trap catalyst monitoring routine which will be further described in reference to FIG. 7.

At 650, routine 600 may stop the OSC monitor and engine operation may be returned to lean or stoichiometric operation per existing engine operating parameters. Routine 600 then ends.

Referring now to FIG. 7, an example routine 700 is shown for monitoring a state of degradation of an underbody (UB) trap catalyst, wherein the UB trap catalyst may be the emission control device 178 described in FIGS. 1-2. Specifically, the state of degradation of the UB trap catalyst may be dependent on a state of degradation of an upstream oxygen storage catalyst (OSC), wherein the upstream OSC may be second catalyst 182 of FIGS. 1-2 and/or catalyst 300 of FIG. 3. Instructions for carrying out routine 700 and the rest of the methods included herein may be executed by a controller based on instructions stored on a memory of the controller and in conjunction with signals received from sensors of the engine system, such as the sensors described above with reference to FIGS. 1-2. In particular, sensor 188 may supply feedback to controller 12. The controller may employ engine actuators of the engine system to adjust engine operation, according to the methods described below. In reference to FIGS. 1-2, this may include, as a non-limiting example, regulating an exhaust air/fuel ratio (AFR) by adjusting ignition timing via ignition system 190 and/or reducing fuel injection via electronic driver 168 and/or electronic driver 171.

At 702, routine 700 may determine whether UB trap catalyst monitor entry conditions are met. The UB trap catalyst monitor entry conditions may include a vehicle startup event. In one example, the UB trap catalyst monitor may function continuously upon a vehicle startup event. In another example, the UB trap catalyst monitor entry conditions may be based in part on a time interval having elapsed since completion of the most recent preceding UB trap catalyst monitoring routine. For example, the UB trap catalyst monitoring routine may be executed once every minute, once every hour, once every week, once every 100 miles, or other suitable interval.

If the UB trap catalyst entry conditions are not met, for example if enough time has not elapsed since completion of the most recent preceding UB trap catalyst monitoring routine, routine 700 may progress to 704 to maintain current engine operation without UB trap catalyst monitoring and routine 700 ends. If, however, the UB trap catalyst monitor entry conditions are met at 702, for example, if a time interval has elapsed since completion of the most recent preceding UB trap catalyst monitoring routine, routine 700 may progress to 710.

At 710, upon receipt of a flag from an OSC monitoring routine (as shown in FIG. 6), routine 700 may determine a state of degradation of an upstream OSC. If, upon receipt of a fault flag from the OSC monitoring routine, it is determined that the upstream OSC has degraded or has degraded past a threshold, routine 700 may progress to 712 to assign a first rate of degradation to a calculation of the state of degradation of the UB trap catalyst. In some examples, the first rate of degradation may be associated with a fault flag which may further be associated with one of a range of values indicating an extent of degradation of the upstream OSC. If, upon receipt of a fault flag from the OSC monitoring routine, it is determined that the upstream OSC has not degraded or has not degraded past a threshold, routine 700 may progress to 714 to assign a second rate of degradation to the calculation of the state of degradation of the UB trap catalyst. In some examples, the second rate of degradation may be associated with a pass flag which may further be associated with one of a range of values indicating an extent of degradation of the upstream OSC. The second rate of degradation may be lower than the first rate of degradation. As such, the second rate of degradation may account for protection of the UB trap catalyst from degradation by the presence of the upstream OSC in the calculation of the state of degradation of the UB trap catalyst.

Further, routine 700 may be employed to indicate an estimated state of degradation of the UB trap catalyst based in part on a time interval having elapsed at an air/fuel ratio (AFR) richer than threshold. A sensor which may be an oxygen sensor located upstream of the UB trap catalyst, such as second oxygen sensor 186 (as shown in FIGS. 1-2) and/or sensor 128, may indicate that the AFR is richer than a threshold. In one example, the upstream sensor indicating that the AFR is richer than a threshold may include the upstream sensor switching from reading lean to reading rich. In another example, the upstream sensor indicating that the AFR is richer than a threshold may include the upstream sensor outputting a value indicative that the AFR is richer than a threshold (such as richer than lambda).

At 720, routine 700 may estimate the state of degradation of the UB trap catalyst via a calculation employing the first rate of degradation or the second rate of degradation. The calculation of the state of degradation of the UB trap catalyst may be based on a time spent at one or more engine operating parameters, such as rich air/fuel ratio (AFR) and/or exhaust gas temperature above a threshold. Further, in some examples, the calculation of the state of degradation of the UB trap catalyst may be based on miles driven. The time spent at the one or more engine operating parameters may be restricted to begin, for example, at a time following or immediately following a vehicle manufacture, a vehicle start-up event, or a previous UB trap catalyst monitoring routine. The memory of the controller may store one or more estimations or summed estimations of the state of degradation of the UB trap catalyst from prior calculations of the state of degradation of the UB trap catalyst. The first rate of degradation or the second rate of degradation may be multiplied by the time spent at the one or more engine parameters to estimate the state of degradation of the UB trap catalyst. The estimation of the state of the degradation of the UB trap catalyst may be summed with the one or more estimations or summed estimations of the state of degradation of the UB trap catalyst stored in the memory of the controller. An upstream sensor may indicate when the one or more engine operating parameters have a value or values past a threshold or thresholds. In particular, the upstream sensor may be a temperature sensor and/or an exhaust gas sensor located upstream of the UB trap catalyst, such as sensor 188 (as shown in FIGS. 1-2).

For example, at 722, routine 700 may estimate the state of degradation of the UB trap catalyst based on a time having elapsed at an AFR richer than a threshold wherein the upstream sensor (being in this example an exhaust gas sensor) may indicate that the AFR is richer than the threshold. A total time elapsed at the AFR being richer than the threshold may have begun following a vehicle manufacture, a vehicle start-up event, or a previous UB trap catalyst monitoring routine. The first rate of degradation or the second rate of degradation may be multiplied by the total time elapsed at the AFR being richer than the threshold to estimate the state of degradation of the UB trap catalyst.

For example, each time that the engine is operated at a rich AFR, the controller may store the time (e.g., in seconds) that the engine was operated rich. The rich operation may indicated based on output from an exhaust gas sensor, such as sensor 128 (which is sampled at a high rate), or based on commanded air-fuel ratio. The catalyst monitor may obtain the total time spent at rich AFR since the prior execution of the catalyst monitor and multiply the total time by the appropriate rate of degradation (e.g., the first rate or the second rate) to obtain an effective time at rich AFR. The catalyst monitor may then sum this effective time at rich AFR with any prior effective times at rich AFR values. In this way, a running total of the effective amount of time spent at rich AFR may be determined, where the running total effective amount of time accounts for the degradation state of the upstream OSC (due to the appropriate rate of degradation being applied). The running total effective amount of time may comprise the time spent at rich AFR beginning from vehicle manufacture, beginning from when a fresh UB trap catalyst was installed, or other suitable time period.

In an additional or alternative example, at 724, routine 700 may estimate the state of degradation of the UB trap catalyst based on a time having elapsed at an exhaust gas temperature hotter than a threshold wherein the upstream sensor (being in this example a temperature sensor) may indicate that the exhaust gas temperature is hotter than the threshold. A total time elapsed at the exhaust gas temperature being hotter than the threshold may have begun following a vehicle manufacture, a vehicle start-up event, or a previous UB trap catalyst monitoring routine. The first rate of degradation or the second rate of degradation may be multiplied by the total time elapsed at the exhaust gas temperature being hotter than the threshold to estimate the state of degradation of the UB trap catalyst. For example, during each operating period where the exhaust gas temperature exceeds a threshold temperature (e.g., 500° C., herein also referred to as high exhaust gas temperature), the controller may store the time (e.g., in seconds) during which the exhaust gas temperature exceeded the threshold temperature. The catalyst monitor may obtain the total time spent at the high exhaust gas temperature since the prior execution of the catalyst monitor and multiply the total time by the appropriate rate of degradation (e.g., the first rate or the second rate) to obtain an effective time at high exhaust gas temperature. The catalyst monitor may then sum this effective time with any prior effective times at high exhaust gas temperature. In this way, a running total of the effective amount of time spent at the exhaust gas temperature above the threshold may be determined, where the running total amount of time accounts for the degradation state of the upstream OSC (due to the appropriate rate of degradation being applied). The running total effective amount of time may comprise the time spent at high exhaust gas temperature beginning from vehicle manufacture, beginning from when a fresh UB trap catalyst was installed, or other suitable time period.

In an additional or alternative example, at 726, routine 700 may estimate the state of degradation of the UB trap catalyst based on an amount of miles driven wherein the memory of the controller may store the amount of miles. The total amount of miles driven may include the total amount of miles driven following a vehicle manufacture, following a vehicle start-up event, or following a previous UB trap catalyst monitoring routine, for example. The first rate of degradation or the second rate of degradation may be multiplied by the total amount of miles driven to estimate the state of degradation of the UB trap catalyst.

Further, in some examples, the UB trap catalyst degradation state may be determined based on more than one operating parameter, such as both time at rich AFR and time at high exhaust gas temperature. For example, each time the engine is operated at rich AFR, the exhaust gas temperature may be monitored. When the engine is operated rich and the exhaust gas temperature is above a threshold, the total amount of time spent at the rich AFR with the high exhaust gas temperature may be recorded. The controller may maintain a running total of the time spent at rich AFR with high exhaust gas temperature, and may multiply each obtained time by the appropriate rate of degradation to generate the estimation of the UB trap catalyst degradation state.

At 730, routine 700 may determine whether the estimation of the state of degradation of the UB trap catalyst has surpassed a threshold. The threshold may be a suitable threshold that reflects a prediction that the UB trap catalyst is degraded due to prolonged exposure to exhaust gas, and in particular due to prolonged exposure to hot, rich exhaust gas. The threshold may be based on the operating parameter(s) used to predict the UB trap catalyst degradation. For example, when the estimation of the degradation of the UB trap catalyst is based on the total vehicle mileage, the threshold may be 200,000 miles or other suitable mileage value. When the estimation of the degradation of the UB trap catalyst is based on the total effective time spent at rich AFR, the threshold may be 100,000 seconds or other suitable amount of time.

Using the total effective vehicle mileage as an example, the first rate of degradation may be 1 and the second rate of degradation may be 1.5. When the OSC is not degraded (e.g., during the first 150,000 miles that the vehicle is driven), the first rate of degradation is applied due to the upstream OSC not being degraded, and thus the effective mileage may be equal to the actual mileage. Once the OSC is determined to be degraded, each additional mile added to the total mileage (calculated while the OSC was not degraded) may be multiplied by the second rate of degradation (such as 1.5). As an example, if the OSC is determined to be degraded at 150,000 miles, each additional mile driven after 150,000 miles may, for the purposes of the catalyst monitor, effectively constitute 1.5 miles. Thus, the running total effective vehicle mileage calculated by the catalyst monitor for the purposes of assessing UB trap catalyst degradation may reach the threshold of 200,000 miles when the actual vehicle mileage is 183,333 miles, for example. In this way, once the OSC is degraded, the predicted degradation of the UB trap catalyst may be accelerated to account for the loss of protection provided by the OSC.

If it is determined that the UB trap catalyst has degraded or that the UB trap catalyst has degraded past a threshold, routine 700 may progress to 732 to set a fault flag. In some examples, the fault flag may be associated with one of a range of values indicating an extent of degradation of the UB trap catalyst. In one example, the state of degradation of the UB trap catalyst may be considered degraded based on one or more engine operating parameters having a value or values past a threshold. In another example, the extent of degradation of the UB trap catalyst may take on a range of values, a value in the range of values being based on the one or more engine operating parameters. The one or more engine operating parameters may include the AFR, the exhaust gas temperature, and/or the miles driven. For example, the fault flag may be a binary flag that only indicates whether or not the UB trap catalyst is degraded. In other examples, the fault flag may indicate the level of degradation, e.g., mildly degraded (if the effective operating parameter value is within 10% of the threshold), moderately degraded (if the effective operating parameter value exceeds the threshold by 10-20%), and fully degraded (if the effective operating parameter value exceeds the threshold by more than 20%).

Routine 700 may then progress to 734 to generate a driver indication of the state of degradation of the UB trap catalyst, to store a diagnostic code, and/or to alter engine operating parameters. The engine operating parameters may be altered to regulate the AFR and/or the exhaust gas temperature to prevent or mitigate further UB trap catalyst degradation. The engine operating parameters may include, for example, engine speed, vehicle speed, fuel injection, engine load, and/or engine torque output. In some examples, the engine operating parameters may be adjusted to limit the production of some engine-out emissions, such as NOx, owing to the prediction that the UB trap catalyst may be degraded. Example operating parameters that may be adjusted to lower engine-out emissions include exhaust gas recirculation (EGR) rate, fuel injection timing and/or spark timing, intake and/or exhaust valve timing, etc. In still further examples, altering the engine operating parameters may include initiating a secondary, intrusive catalyst monitoring routine to confirm whether the UB trap catalyst is actually degraded. The secondary catalyst monitoring routine may include purposeful changes to engine AFR, for example, in order to monitor release of HC or other emissions from the UB trap catalyst.

If, on the other hand, it is determined that the UB trap catalyst has not degraded or that the UB trap catalyst has not degraded past a threshold, routine 700 may progress from 730 to 736 to set a pass flag. In some examples, the pass flag may be associated with one of a range of values indicating an extent of degradation of the UB trap catalyst. In one example, the state of degradation of the UB trap catalyst may be considered not degraded based on one or more engine operating parameters having a value or values past a threshold. In another example, the extent of degradation of the UB trap catalyst may take on a range of values, a value in the range of values being based on the one or more engine operating parameters. The one or more engine operating parameters may include the AFR, the exhaust gas temperature, and/or the miles driven. For example, the pass flag may be a binary flag that only indicates whether or not the UB trap catalyst is degraded. In other examples, the pass flag may indicate the level of functionality of the UB trap catalyst, e.g., fresh (if the effective operating parameter value is at least 50% lower than the threshold), mildly aged (if the effective operating parameter value is 25-50% lower than the threshold), and moderately aged (if the effective operating parameter value is 25% or less lower than the threshold).

At 740, routine 700 may stop the UB trap catalyst monitor. Routine 700 then ends.

In this way, a nickel-based oxygen storage catalyst may be placed upstream of an underbody $HC/NO_x$; trap catalyst in order to reduce or delay degradation of the UB trap catalyst caused by exposure to hot, rich exhaust gas. In particular, the oxygen storage catalyst may be a nickel-based oxygen storage catalyst located in an exhaust passage upstream of a trap catalyst. The trap catalyst may include a zeolite trap material modified with platinum group metals. The oxygen storage catalyst may regulate exhaust gas air/fuel ratios and may thereby protect the trap catalyst from degradation under rich air/fuel ratio excursions. Additionally, an oxygen storage catalyst monitoring routine may monitor a state of degradation of the oxygen storage catalyst, an output of which may be associated with a flag to regulate engine operating parameters. Further, the output from the oxygen storage catalyst monitoring routine may be passed to a trap catalyst monitoring routine. The trap catalyst monitoring routine may monitor a state of degradation of the trap catalyst, an output of which may be associated with a flag to regulate engine operating parameters. Thus, the output of the trap catalyst monitoring routine may be dependent upon the output of the oxygen storage catalyst monitoring routine, as follows from dependency of the state of degradation of the trap catalyst on the state of degradation of the oxygen storage catalyst. In the integrated system described above, expenses associated with catalyst degradation and subsequent catalyst replacement may be lowered and exhaust emissions may be reduced by prolonging the useful life of the component catalysts comprising the multicomponent exhaust aftertreatment device.

A technical effect of including a nickel-based oxygen storage catalyst upstream of a metal-modified zeolite trap catalyst is reduced or delayed degradation of the trap catalyst. A further technical effect of estimating degradation of the trap catalyst based on a degradation state of the oxygen storage catalyst is increased accuracy of predicting degradation of the trap catalyst, which may reduce reliance on fuel-intensive or performance-reducing intrusive monitoring methods and may allow adjustment of engine operating parameters to lower emissions if degradation is predicted.

An example of a system for a vehicle comprises an oxygen storage catalyst and an underbody trap catalyst comprising metal modified zeolite, the oxygen storage catalyst arranged upstream of the underbody trap catalyst in an exhaust passage of the vehicle. A first example of the system further includes the oxygen storage catalyst comprising an oxygen storage material loaded on or impregnated in a carrier body, the oxygen storage material including nickel, iron, and/or cerium. A second example of the system, optionally including the first example of the system, further includes the carrier body comprising cordierite, zirconium oxide, silicon carbide, or silica gel. A third example of the system, optionally including one or both of the first and second examples of the system, further includes the oxygen storage material being present in the oxygen storage catalyst at 10% or greater weight per weight of the carrier body. A fourth example of the system, optionally including one or more or each of the first through third examples of the system, further includes the underbody trap catalyst further comprising a three-way catalyst washcoat, the three-way catalyst washcoat including one or more platinum group metals, and the metal modified zeolite comprising platinum group metal modified zeolite. A fifth example of the system, optionally including one or more or each of the first through fourth examples of the system, further includes an engine coupled to the exhaust passage and a three-way catalyst coupled downstream of the engine and upstream of the oxygen storage catalyst in the exhaust passage of the vehicle, wherein the three-way catalyst is positioned in the exhaust passage 13-33 cm from the engine, and wherein the underbody trap catalyst is positioned in the exhaust passage 25 cm or greater from the three-way catalyst. A sixth example of the system, optionally including one or more or each of the first through fifth examples of the system, further includes a controller storing instructions in non-transitory memory executable by a processor to determine a rate of degradation of the underbody trap catalyst based on a degradation state of the oxygen storage catalyst, determine an estimated degradation state of the underbody trap catalyst based on the rate of degradation, and responsive to the estimated degradation state of the underbody trap catalyst meeting a predetermined condition relative to a threshold, adjust one or more engine operating parameters of an engine of the vehicle. A seventh example of the system, optionally including one or more or each of the first through sixth examples of the system, further includes the one or more engine operating parameters comprising engine speed, fuel injection amount, ignition timing, throttle position, engine load, and/or engine torque output. An eighth example of the system, optionally including one or more or each of the first through seventh examples of the system, further includes the instructions being executable to determine the degradation state of the oxygen storage catalyst by, following an engine operating period with lean air-fuel ratio, operate the engine with rich air-fuel ratio, determine an amount of fuel mass required to react with all stored oxygen in the oxygen storage catalyst following commencement of the operation of the engine with the rich air-fuel ratio, and assign the oxygen storage catalyst a degradation state based on the determined amount of fuel mass. A ninth example of the system, optionally including one or more or each of the first through eighth examples of the system, further includes the instructions being executable to assign the oxygen storage catalyst a first, non-degraded degradation state when the determined amount of fuel mass is above a threshold fuel mass and assign the oxygen storage catalyst a second, degraded degradation state when the determined amount of fuel mass is below the threshold fuel mass. A tenth example of the system, optionally including one or more or each of the first through ninth examples of the system, further includes the instructions being executable to set the rate of degradation of the underbody trap catalyst to a first rate when the oxygen storage catalyst is in the first, non-degraded degradation state and set the rate of degradation of the underbody trap catalyst to a second rate, higher than the first rate, when the oxygen storage catalyst is in the second, degraded degradation state. An eleventh example of the system, optionally including one or more or each of the first through tenth examples of the system, further includes the instructions being executable to determine the estimated degradation state of the underbody trap catalyst based on the rate of degradation and further based on a total distance traveled by the vehicle, a total time spent at rich air-fuel ratio, and/or a total time spent at exhaust gas temperature above a threshold.

An example of a method comprises, during rich air-fuel ratio conditions where exhaust gas temperature is greater than a threshold temperature, releasing stored oxygen from an oxygen storage catalyst and supplying the released oxygen to an underbody trap catalyst positioned downstream of the oxygen storage catalyst, monitoring a degradation state of the oxygen storage catalyst based on an oxygen storage capacity of the oxygen storage catalyst, responsive to the degradation state of the oxygen storage catalyst meeting a predetermined condition, accelerating a rate of degradation of the underbody trap catalyst, predicting whether the underbody trap catalyst is degraded based on the rate of degradation, and responsive to predicting that the underbody trap catalyst is degraded, adjusting one or more engine operating parameters. A first example of the method further includes accelerating the rate of degradation of the underbody trap catalyst comprising, responsive to the degradation state of the oxygen storage catalyst indicating that the oxygen storage capacity of the oxygen storage catalyst is below a threshold capacity, increasing the rate of degradation from a first rate of degradation to a higher, second rate of degradation. A second example of the method, optionally including the first example of the method, further includes predicting whether the underbody trap catalyst is degraded based on the rate of degradation comprising, when the oxygen storage capacity is above the threshold capacity, calculating a first effective time spent at a given operating parameter by multiplying a time spent at the given operating parameter by the first rate of degradation, and summing all first effective times spent at the given operating parameter to generate a first running effective time spent at the given operating parameter, once the oxygen storage capacity drops below the threshold capacity, calculating a second effective time spent at the given operating parameter by multiplying a time spent at the given operating parameter by the second rate of degradation, and summing the first running effective time and all second effective times spent at the given operating parameter to generate a second running effective time spent at the given operating parameter, and predicting that the underbody trap catalyst is degraded responsive to the second running effective time exceeding a threshold. A third example of the method, optionally including one or both of the first and second examples of the method, further includes the given operating parameter comprising air-fuel ratio below a threshold ratio and/or exhaust gas temperature above a threshold temperature.

An example of a system for a hybrid vehicle comprises a nickel-based oxygen storage catalyst, an underbody trap catalyst comprising metal modified zeolite, the nickel-based oxygen storage catalyst arranged upstream of the underbody trap catalyst in an exhaust passage of the vehicle, and a controller storing instructions in non-transitory memory executable by a processor to monitor a degradation state of the nickel-based oxygen storage catalyst based on an oxygen storage capacity of the nickel-based oxygen storage catalyst, predict whether the underbody trap catalyst is degraded based on a rate of degradation of the underbody trap catalyst, the rate of degradation based on the degradation state of the nickel-based oxygen storage catalyst, and responsive to predicting that the underbody trap catalyst is degraded, adjust one or more engine operating parameters. A first example of the system further includes the instructions being executable to adjust fuel injection quantity, ignition timing, and/or cylinder valve timing responsive to predicting that the underbody trap catalyst is degraded. A second example of the system, optionally including the first example of the system, further includes the instructions being executable to, when the oxygen storage capacity is above a threshold capacity, set the rate of degradation to be a first rate of degradation and calculate a first vehicle mileage by multiplying total vehicle mileage by the first rate of degradation, once the oxygen storage capacity is below the threshold capacity, set the rate of degradation to be a second rate of degradation and calculate a second vehicle mileage by multiplying each mile driven since the oxygen storage capacity dropped below the threshold capacity by the second rate of degradation, and adding the second vehicle mileage to the first vehicle mileage to generate an effective vehicle mileage, and predict that the underbody trap catalyst is degraded responsive to the effective vehicle mileage exceeding a threshold. A third example of the system, optionally including one or both of the first and second examples of the system, further includes the nickel-based oxygen storage catalyst comprising a nickel-based oxygen storage material and a carrier body, the nickel-based oxygen storage material being present in the nickel-based oxygen storage catalyst at 10% or greater weight per weight of the carrier body, the metal modified zeolite comprising platinum group metal modified zeolite, the exhaust passage being coupled to an engine, and the hybrid vehicle being configured to be propelled by the engine and/or an electric motor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a vehicle, comprising:
   an oxygen storage catalyst comprising nickel loaded on or impregnated in a carrier body, the nickel present in the oxygen storage catalyst at 10% or greater weight per weight of the carrier body, the carrier body comprising cordierite, zirconium oxide, silicon carbide, or silica gel; and an underbody trap catalyst comprising metal modified zeolite configured to trap hydrocarbon (HC), carbon monoxide (CO), and/or NOx and a three-way catalyst washcoat configured to covert HC, CO, and/or NOx released from the metal modified zeolite, the oxygen storage catalyst arranged upstream of the underbody trap catalyst in an exhaust passage of the vehicle.

2. The system of claim 1, wherein the underbody trap catalyst is configured to trap HC via the metal modified zeolite and convert the HC via the three-way catalyst washcoat.

3. The system of claim 1, wherein the three-way catalyst washcoat includes one or more platinum group metals, and wherein the metal modified zeolite comprises platinum group metal modified zeolite.

4. The system of claim 3, further comprising an engine coupled to the exhaust passage and a three-way catalyst coupled downstream of the engine and upstream of the oxygen storage catalyst in the exhaust passage of the vehicle, wherein the three-way catalyst is positioned in the exhaust passage 13-33 cm from the engine, wherein the underbody trap catalyst is positioned in the exhaust passage 25 cm or greater from the three-way catalyst, and wherein the oxygen storage catalyst is positioned closer to the three-way catalyst than to the underbody trap catalyst.

5. The system of claim 1, further comprising a controller storing instructions in non-transitory memory executable by a processor to:
    determine a rate of degradation of the underbody trap catalyst based on a degradation state of the oxygen storage catalyst;
    determine an estimated degradation state of the underbody trap catalyst based on the rate of degradation; and
    responsive to the estimated degradation state of the underbody trap catalyst meeting a predetermined condition relative to a threshold, adjust one or more engine operating parameters of an engine of the vehicle.

6. The system of claim 5, wherein the one or more engine operating parameters comprise engine speed, fuel injection amount, ignition timing, throttle position, engine load, and/or engine torque output.

7. The system of claim 5, wherein the instructions are executable to determine the degradation state of the oxygen storage catalyst by:
    following an engine operating period with lean air-fuel ratio, operate the engine with rich air-fuel ratio;
    determine an amount of fuel mass required to react with all stored oxygen in the oxygen storage catalyst following commencement of the operation of the engine with the rich air-fuel ratio; and
    assign the oxygen storage catalyst a degradation state based on the determined amount of fuel mass.

8. The system of claim 7, wherein the instructions are executable to assign the oxygen storage catalyst a first, non-degraded degradation state when the determined amount of fuel mass is above a threshold fuel mass and assign the oxygen storage catalyst a second, degraded degradation state when the determined amount of fuel mass is below the threshold fuel mass.

9. The system of claim 8, wherein the instructions are executable to set the rate of degradation of the underbody trap catalyst to a first rate when the oxygen storage catalyst is in the first, non-degraded degradation state and set the rate of degradation of the underbody trap catalyst to a second rate, higher than the first rate, when the oxygen storage catalyst is in the second, degraded degradation state.

10. The system of claim 9, wherein the instructions are executable to determine the estimated degradation state of the underbody trap catalyst based on the rate of degradation and further based on a total distance traveled by the vehicle, a total time spent at rich air-fuel ratio, and/or a total time spent at an exhaust gas temperature above a threshold.

11. A method for an underbody trap catalyst, the method executable by an electronic controller via instructions stored in non-transitory memory of the electronic controller, comprising:
    during rich air-fuel ratio conditions where exhaust gas temperature is greater than a threshold temperature, releasing stored oxygen from an oxygen storage catalyst and supplying the released oxygen to the underbody trap catalyst positioned downstream of the oxygen storage catalyst;
    monitoring, via the electronic controller, a degradation state of the oxygen storage catalyst based on an oxygen storage capacity of the oxygen storage catalyst;
    responsive to the degradation state of the oxygen storage catalyst meeting a predetermined condition, accelerating, via the electronic controller, a rate of degradation of the underbody trap catalyst;
    predicting, via the electronic controller, whether the underbody trap catalyst is degraded based on the rate of degradation; and
    responsive to predicting that the underbody trap catalyst is degraded, adjusting, via the electronic controller, one or more engine operating parameters.

12. The method of claim 11, wherein accelerating the rate of degradation of the underbody trap catalyst comprises, responsive to the degradation state of the oxygen storage catalyst indicating that the oxygen storage capacity of the oxygen storage catalyst is below a threshold capacity, increasing the rate of degradation from a first rate of degradation to a higher, second rate of degradation.

13. The method of claim 12, wherein predicting whether the underbody trap catalyst is degraded based on the rate of degradation comprises:
    when the oxygen storage capacity is above the threshold capacity, calculating a first effective time spent at a given operating parameter by multiplying a time spent at the given operating parameter by the first rate of degradation, and summing all first effective times spent at the given operating parameter to generate a first running effective time spent at the given operating parameter;
    once the oxygen storage capacity drops below the threshold capacity, calculating a second effective time spent at the given operating parameter by multiplying a time spent at the given operating parameter by the second rate of degradation, and summing the first running effective time and all second effective times spent at the given operating parameter to generate a second running effective time spent at the given operating parameter; and
    predicting that the underbody trap catalyst is degraded responsive to the second running effective time exceeding a threshold.

14. The method of claim 13, wherein the given operating parameter comprises an air-fuel ratio below a threshold ratio and/or an exhaust gas temperature above a threshold temperature.

15. A system for a hybrid vehicle, comprising:
    a nickel-based oxygen storage catalyst;
    an underbody trap catalyst comprising metal modified zeolite, the nickel-based oxygen storage catalyst arranged upstream of the underbody trap catalyst in an exhaust passage of the vehicle; and a controller storing instructions in non-transitory memory executable by a processor to:

monitor a degradation state of the nickel-based oxygen storage catalyst based on an oxygen storage capacity of the nickel-based oxygen storage catalyst;

predict whether the underbody trap catalyst is degraded based on a rate of degradation of the underbody trap catalyst, the rate of degradation based on the degradation state of the nickel-based oxygen storage catalyst; and responsive to predicting that the underbody trap catalyst is degraded, adjust one or more engine operating parameters.

16. The system of claim 15, wherein the instructions are executable to adjust fuel injection quantity, ignition timing, and/or cylinder valve timing responsive to predicting that the underbody trap catalyst is degraded.

17. The system of claim 15, wherein the instructions are executable to:

when the oxygen storage capacity is above a threshold capacity, set the rate of degradation to be a first rate of degradation and calculate a first vehicle mileage by multiplying total vehicle mileage by the first rate of degradation;

once the oxygen storage capacity is below the threshold capacity, set the rate of degradation to be a second rate of degradation and calculate a second vehicle mileage by multiplying each mile driven since the oxygen storage capacity dropped below the threshold capacity by the second rate of degradation, and adding the second vehicle mileage to the first vehicle mileage to generate an effective vehicle mileage; and predict that the underbody trap catalyst is degraded responsive to the effective vehicle mileage exceeding a threshold.

18. The system of claim 15, wherein the nickel-based oxygen storage catalyst comprises a nickel-based oxygen storage material and a carrier body, wherein the nickel-based oxygen storage material is present in the nickel-based oxygen storage catalyst at 10% or greater weight per weight of the carrier body, wherein the metal modified zeolite comprises platinum group metal modified zeolite, wherein the exhaust passage is coupled to an engine, and wherein the hybrid vehicle is configured to be propelled by the engine and/or an electric motor.

* * * * *